US008049709B2

(12) United States Patent  (10) Patent No.: US 8,049,709 B2
Roberts et al.  (45) Date of Patent: Nov. 1, 2011

(54) SYSTEMS AND METHODS FOR CONTROLLING A SOLID STATE LIGHTING PANEL

(75) Inventors: John K. Roberts, Grand Rapids, MI (US); Keith J. Vadas, Lowell, MI (US)

(73) Assignee: Cree, Inc., Durham, NC (US)

( * ) Notice: Subject to any disclaimer, the term of this patent is extended or adjusted under 35 U.S.C. 154(b) by 1211 days.

(21) Appl. No.: 11/745,713

(22) Filed: May 8, 2007

(65) Prior Publication Data

US 2008/0278097 A1  Nov. 13, 2008

(51) Int. Cl.
G09G 3/36 (2006.01)
(52) U.S. Cl. .................................................. 345/102
(58) Field of Classification Search ............. 345/72, 345/88, 102, 204
See application file for complete search history.

(56) References Cited

U.S. PATENT DOCUMENTS

| | | | |
|---|---|---|---|
| 3,787,752 A | 1/1974 | Delay | |
| 4,298,869 A | 11/1981 | Okuno | |
| 4,685,303 A | 8/1987 | Branc et al. | |
| 4,988,889 A | 1/1991 | Oughton, Jr. | |
| 5,128,595 A | 7/1992 | Hara | |
| 5,461,397 A * | 10/1995 | Zhang et al. | 345/102 |
| 5,661,645 A | 8/1997 | Hochstein | |
| 5,767,818 A * | 6/1998 | Nishida | 345/1.1 |
| 5,783,909 A | 7/1998 | Hochstein | |
| 5,793,343 A * | 8/1998 | Hart et al. | 345/84 |
| 5,812,105 A | 9/1998 | Van de Ven | |
| 5,973,483 A | 10/1999 | Jo | |
| 6,051,935 A | 4/2000 | Bucks et al. | |
| 6,150,771 A | 11/2000 | Perry | |
| 6,153,985 A | 11/2000 | Grossman | |
| 6,161,910 A | 12/2000 | Reisenauer et al. | |
| 6,236,331 B1 | 5/2001 | Dussureault | |
| 6,285,139 B1 | 9/2001 | Ghanem | |
| 6,329,758 B1 | 12/2001 | Salam | |
| 6,329,760 B1 | 12/2001 | Bebenroth | |
| 6,329,764 B1 | 12/2001 | Van de Ven | |
| 6,351,079 B1 | 2/2002 | Willis | |
| 6,362,578 B1 | 3/2002 | Swanson et al. | |
| 6,388,393 B1 | 5/2002 | Illingworth | |
| 6,441,558 B1 | 8/2002 | Muthu et al. | |
| 6,459,919 B1 | 10/2002 | Lys et al. | |
| 6,510,995 B2 | 1/2003 | Muthu et al. | |
| 6,515,434 B1 | 2/2003 | Biebl | |

(Continued)

FOREIGN PATENT DOCUMENTS

GB  2 249 840  5/1992

(Continued)

OTHER PUBLICATIONS 2007-114628, Taisuke, Senda May 10, 2007, 12 pages, translation of Detailed Description.*

(Continued)

Primary Examiner — Nitin Patel
(74) Attorney, Agent, or Firm — Myers Bigel Sibley & Sajovec

(57) ABSTRACT

Provided are systems and methods for controlling a solid state lighting panel. A system according to some embodiments of the invention includes a controller that provides control signals to current drivers that are configured to provide current to multiple solid state lighting devices. The system also includes a sequence generator that generates a firing sequence for firing multiple strings of slid state lighting devices.

55 Claims, 12 Drawing Sheets

U.S. PATENT DOCUMENTS

| | | | |
|---|---|---|---|
| 6,552,495 B1 | 4/2003 | Chang | |
| 6,577,072 B2 | 6/2003 | Saito et al. | |
| 6,577,512 B2 | 6/2003 | Tripathi et al. | |
| 6,586,890 B2 | 7/2003 | Min et al. | |
| 6,616,291 B1 | 9/2003 | Love | |
| 6,618,031 B1 | 9/2003 | Bohn, Jr. et al. | |
| 6,630,801 B2 | 10/2003 | Schuurmans | |
| 6,793,374 B2 | 9/2004 | Begemann | |
| 6,836,081 B2 | 12/2004 | Swanson et al. | |
| 6,847,342 B2* | 1/2005 | Tsuji | 345/82 |
| 6,858,994 B2 | 2/2005 | Vollrath | |
| 6,985,124 B1* | 1/2006 | Nogawa | 345/55 |
| 7,014,336 B1 | 3/2006 | Ducharme et al. | |
| 7,038,399 B2 | 5/2006 | Lys et al. | |
| 7,088,334 B2 | 8/2006 | Adachi et al. | |
| 7,122,971 B2 | 10/2006 | Yeh et al. | |
| 7,148,632 B2 | 12/2006 | Berman et al. | |
| 7,202,608 B2 | 4/2007 | Robinson et al. | |
| 7,213,940 B1 | 5/2007 | Van De Ven et al. | |
| 7,239,087 B2 | 7/2007 | Ball | |
| 7,285,923 B2* | 10/2007 | Yu | 315/307 |
| 7,317,287 B2 | 1/2008 | Blumel | |
| 7,327,337 B2* | 2/2008 | Callahan | 345/82 |
| 7,365,717 B2* | 4/2008 | Lee et al. | 345/77 |
| 7,557,524 B2 | 7/2009 | Chevalier et al. | |
| 7,557,779 B2* | 7/2009 | Tanada | 345/76 |
| 7,633,577 B2* | 12/2009 | Moon et al. | 349/69 |
| 7,642,725 B2* | 1/2010 | Cusinato et al. | 345/102 |
| 7,724,220 B2* | 5/2010 | Yen et al. | 345/83 |
| 2001/0024112 A1 | 9/2001 | Jacobs et al. | |
| 2002/0070914 A1* | 6/2002 | Bruning et al. | 345/102 |
| 2002/0145392 A1 | 10/2002 | Hair, III et al. | |
| 2003/0112216 A1* | 6/2003 | Choi | 345/102 |
| 2004/0046510 A1 | 3/2004 | Allen | |
| 2005/0035728 A1 | 2/2005 | Schanberger et al. | |
| 2005/0231459 A1* | 10/2005 | Furukawa | 345/102 |
| 2006/0125773 A1* | 6/2006 | Ichikawa et al. | 345/102 |
| 2006/0139954 A1 | 6/2006 | Kobori et al. | |
| 2006/0176411 A1 | 8/2006 | Furukawa | |
| 2006/0214876 A1* | 9/2006 | Jendbro et al. | 345/46 |
| 2007/0046590 A1* | 3/2007 | Umezaki et al. | 345/76 |
| 2007/0115248 A1 | 5/2007 | Roberts et al. | |
| 2007/0137074 A1 | 6/2007 | Van De Ven et al. | |
| 2007/0139920 A1 | 6/2007 | Van De Ven et al. | |
| 2007/0139923 A1 | 6/2007 | Negley et al. | |
| 2007/0159434 A1* | 7/2007 | Yen et al. | 345/92 |
| 2007/0170447 A1 | 7/2007 | Negley et al. | |
| 2007/0171145 A1 | 7/2007 | Coleman et al. | |
| 2007/0236911 A1 | 10/2007 | Negley | |
| 2007/0247414 A1* | 10/2007 | Roberts | 345/102 |
| 2007/0263393 A1 | 11/2007 | Van De Ven | |
| 2007/0267983 A1 | 11/2007 | Van De Ven et al. | |
| 2007/0274063 A1 | 11/2007 | Negley | |
| 2007/0274080 A1 | 11/2007 | Negley et al. | |
| 2007/0278503 A1 | 12/2007 | Van De Ven et al. | |
| 2007/0278934 A1 | 12/2007 | Van De Ven et al. | |
| 2007/0279440 A1 | 12/2007 | Negley | |
| 2007/0279903 A1 | 12/2007 | Negley et al. | |
| 2007/0280624 A1 | 12/2007 | Negley et al. | |
| 2008/0048582 A1 | 2/2008 | Robinson | |
| 2008/0084685 A1 | 4/2008 | Van De Ven et al. | |
| 2008/0084700 A1 | 4/2008 | Van De Ven | |
| 2008/0084701 A1 | 4/2008 | Van De Ven et al. | |
| 2008/0088248 A1 | 4/2008 | Myers | |
| 2008/0089053 A1 | 4/2008 | Negley | |
| 2008/0106895 A1 | 5/2008 | Van De Ven et al. | |
| 2008/0106907 A1 | 5/2008 | Trott et al. | |
| 2008/0112168 A1 | 5/2008 | Pickard et al. | |
| 2008/0112170 A1 | 5/2008 | Trott et al. | |
| 2008/0130285 A1 | 6/2008 | Negley et al. | |
| 2008/0136313 A1 | 6/2008 | Van De Ven et al. | |
| 2008/0136770 A1* | 6/2008 | Peker et al. | 345/102 |
| 2008/0150877 A1* | 6/2008 | Chao et al. | 345/102 |
| 2008/0198112 A1* | 8/2008 | Roberts | 345/102 |
| 2008/0259589 A1 | 10/2008 | Van De Ven | |
| 2008/0278097 A1 | 11/2008 | Roberts et al. | |
| 2009/0021471 A1* | 1/2009 | Park et al. | 345/102 |
| 2009/0066687 A1* | 3/2009 | Oke et al. | 345/214 |
| 2009/0184666 A1 | 7/2009 | Myers et al. | |

FOREIGN PATENT DOCUMENTS

| | | | |
|---|---|---|---|
| JP | 2006-242733 | | 9/1994 |
| JP | 10-233669 | | 9/1998 |
| JP | 2007-114628 | * | 5/2007 |
| WO | WO 01/63977 A1 | | 8/2001 |

OTHER PUBLICATIONS

In-Plug® series: IPS401, "High Efficiency, High Power Factor, Universal High Brightness White LED Controller", ASIC Advantage Inc.

International Search Report and Written Opinion corresponding to International Application No. PCT/US2007/078368; Mailing Date: Jul. 4, 2008.

International Search Report and Written Opinion corresponding to International Application No. PCT/US2007/012708; Mailing Date: Feb. 20, 2008.

International Search Report and Written Opinion corresponding to International Application No. PCT/US2007/001834; Mailing Date: Apr. 28, 2008.

Second Written Opinion corresponding to International Application No. PCT/US2007/001834; Mailing Date: Oct. 20, 2008.

Partial International Search Report corresponding to International Application No. PCT/US2007/078368; Mailing Date: Feb. 5, 2008.

Perduijn, "Light Output Feedback Solution for RGB LED Backlight Applications".

U.S. Appl. No. 61/039,926, filed Mar. 27, 2008.

International Search Report and Written Opinion (15 pages) corresponding to International Application No. PCT/US2008/005145; Mailing Date: Sep. 2, 2008.

Communication pursuant to Article 94(3) EPC dated Feb. 7, 2011 corresponding to European Application No. 08 743 161.5; 6 pages.

* cited by examiner

SYSTEMS AND METHODS FOR CONTROLLING A SOLID STATE LIGHTING PANEL

FIELD OF THE INVENTION

The present invention relates to solid state lighting, and more particularly, controlling a solid state lighting panel.

BACKGROUND

Solid state lighting arrays are used for a number of lighting applications. For example, solid state lighting panels including arrays of solid state lamps have been used as direct illumination sources, for example, in architectural and/or accent lighting. A solid state lamp may include, for example, a packaged light emitting device including one or more light emitting diodes (LEDs). Inorganic LEDs typically include semiconductor layers forming p-n junctions. Organic LEDs (OLEDs), which include organic light emission layers, are another type of solid state light emitting device. Typically, a solid state light emitting device generates light through the recombination of electronic carriers, i.e. electrons and holes, in a light emitting layer or region.

Solid state lighting panels are commonly used as backlights for small LCD display screens, such as LCD display screens used in portable electronic devices. In addition, there has been increased interest in the use of solid state lighting arrays for backlights of larger displays, such as LCD television displays.

For smaller LCD screens, backlight assemblies typically employ white LED lamps that include a blue-emitting LED coated with a wavelength conversion phosphor that converts some of the blue light emitted by the LED into yellow light. The resulting light, which is a combination of blue light and yellow light, may appear white to an observer. However, while light generated by such an arrangement may appear white, objects illuminated by such light may not appear to have a natural coloring, because of the limited spectrum of the light. For example, because the light may have little energy in the red portion of the visible spectrum, red colors in an object may not be illuminated well by such light. As a result, the object may appear to have an unnatural coloring when viewed under such a light source.

The color rendering index of a light source is an objective measure of the ability of the light generated by the source to accurately illuminate a broad range of colors. The color rendering index ranges from essentially zero for monochromatic sources to nearly 100 for incandescent sources. Light generated from a phosphor-based solid state light source may have a relatively low color rendering index.

For large-scale backlight and illumination applications, it is often desirable to provide a lighting source that generates a white light having a high color rendering index, so that objects and/or display screens illuminated by the lighting panel may appear more natural. Accordingly, such lighting sources may typically include an array of solid state lamps including red, green and blue light emitting devices. When red, green and blue light emitting devices are energized simultaneously, the resulting combined light may appear white, or nearly white, depending on the relative intensities of the red, green and blue sources. There are many different hues of light that may be considered "white." For example, some "white" light, such as light generated by sodium vapor lamps, may appear more yellowish, while other "white" light, such as light generated by some fluorescent lamps, may appear more bluish in color.

Solid state lamps, such as LED's, are current-controlled devices in the sense that the intensity of the light emitted from an LED is related to the amount of current driven through the LED. One common method for controlling the current driven through the solid state lamps to achieve desired intensity and color mixing is a Pulse Width Modulation (PWM) scheme. PWM schemes pulse the solid state lamps alternately to a full current "ON" state followed by a zero current "OFF" state. However, firing all of the solid state lamps simultaneously may result in undesirable electrical power system performance due, for example, to power factor spikes and/or electromagnetic interference due to the associated current rush. Sequentially firing the strings independently and/or in combinations without regard to relative string location within the display, however, can produce undesirable display characteristics.

SUMMARY

In some embodiments, the control system may include firing logic that may determine a firing order of the multiple strings. In some embodiments, the control system may be configured to drive the multiple strings or portions thereof in a spatially non-adjacent, non-sequential or spatially random firing order. In some embodiments, the control system may be configured to drive the multiple strings or portions thereof at different times and/or phases for at least some of the multiple strings or portions thereof. In some embodiments, the control system is configured to drive the multiple strings and/or portions thereof at least partially based on the spatial relationship between the multiple strings or portions thereof and at different phases for at least some of the multiple strings or portions thereof. In some embodiments, the firing logic may include rule-based logic that may operate to generate a non-spatially-sequential firing order. In some embodiments, the rule-based logic may include a rule that a second string fired after a first string is non-adjacent the first string. In some embodiments, the rule-based logic may further include a rule that a first string is fired simultaneously with a second string and the first string is non-adjacent the second string.

A lighting panel system includes multiple strings of solid state lighting devices arranged linearly across the panel in a first direction and positioned at intervals in a second direction that is substantially orthogonal to the first direction. The system also includes a current supply circuit that can selectively supply multiple on-state drive currents to the multiple strings in response to control signals. The system further includes a control system that can selectively provide control signals to the current supply circuit to selectively drive the multiple strings. The control system can include firing logic that can determine a firing order of the multiple strings.

In other embodiments, the firing logic can include rule-based logic that can operate to generate a non-spatially-sequential firing order. The rule-based logic can include a rule that a second string fired after a first string is non-adjacent the first string. The rule-based logic can also include a rule that a first string is fired simultaneously with a second string and the first string is non-adjacent the second string.

In further embodiments, the fighting panel can include multiple bars that extend across the panel in the first direction and are positioned adjacent one another in a substantially parallel arrangement, such that the bars each include some of the multiple strings. In some embodiments, the firing order can cause a first firing, a second firing and a third firing, which each can supply current in a string in each of the first bar, the second bar, and the third bar, where the second bar is below the first bar and the third bar is above the second bar. In other embodiments, first and second portions of the strings can include solid state lighting devices that emit light in a first dominant wavelength and a second dominant wavelength, respectively, where each of the bars includes at least one string of the first portion and at least one string of the second portion and the strings in the first portion are fired in the firing order and then the strings in the second portion are fired in the firing order. In yet other embodiments, at least one string of the first portion can be fired simultaneously with at least one string from the second portion.

Other embodiments can include a first portion of strings in a first bar and a second portion of strings in a second bar where the first and second portions are fired sequentially in the firing order and the firing order determines the location of the second bar in response to the location of the first bar.

In further embodiments, a first portion of the strings includes solid state lighting devices that emit light in a first dominant wavelength and a second portion of strings includes solid state lighting devices that emit light in a second dominant wavelength, where the first portion is fired in the firing order and then the second portion is fired in the firing order.

In yet further embodiments, the firing logic can be random logic that can operate to generate the firing order.

In other embodiments, a means for generating a feedback signal is included to provide display performance information to the control system.

Some embodiments can include methods of controlling a solid state lighting panel having multiple strings of solid state lighting devices configured to extend from a first edge of the panel to a second edge of the panel in substantially adjacent positions relative to one another. Such methods can include supplying pulsed drive currents to the strings in a non-spatially-sequential firing order.

In some embodiments, the firing order can be determined to supply current to a first string and second string, where the second string can be defined based on the location of the first string. In some embodiments, the second string can be defined by selecting a string that is non-adjacent the first string and/or selecting a string that is located a minimum quantity of strings from the first string. In other embodiments, a third string that is fired after the second string can be defined based on the locations of the first and second strings. In some other embodiments, the second string can be defined by selecting a string on a first side of the first string and the third string can be defined by selecting a string on a second side of the second string.

In further embodiments, multiple portions of the strings can be grouped on multiple bars that can extend across the panel from the first edge to the second edge and that are positioned adjacent one another in a substantially parallel arrangement. In yet further embodiments, the portion of strings in the same bar can be supplied current simultaneously. In other embodiments, a random number can be generated, a value can be assigned to each bar and current can be supplied to the portion of strings on a bar based on the random number.

In yet other embodiments, a first portion of strings that includes solid state lighting devices configured to emit light in a first dominant wavelength can be supplied current according to the firing order and then a second portion of strings that includes solid state lighting devices configured to emit light in a second dominant wavelength can be supplied current according to the firing order.

In further embodiments, defining the second string and/or third string can be based on a dominant wavelength emitted by the solid state lighting devices in the first string.

In yet further embodiments, a first string having solid state lighting devices configured to emit light in a first dominant wavelength and a second string having solid state lighting devices configured to emit light in a second dominant wavelength can be simultaneously supplied current.

Other embodiments can include determining the firing order that supplies current to a first string and a second string and defining the second string based on a dominant wavelength of the first string and a relative position of the first string.

Yet other embodiments can include defining the firing order using numerical techniques. Using a numerical technique in some embodiments can include generating a random number, assigning a value to each of the strings and supplying current to one of the strings based on the value of the random number. In some other embodiments, using a numerical technique can include performing a non-linear calculation.

In further embodiments, the firing order can include using a deterministic order based on at least one rule.

A lighting panel system that includes multiple strings of solid state lighting devices that are arranged to extend across the panel in a first direction and are positioned adjacent one another in a second direction and that are supplied current by multiple current drivers can also include a controller that provides control signals to the current drivers and a sequence generator that generates a firing sequence for firing the multiple strings.

In some embodiments, the sequence generator can include a deterministic algorithm that determines a location of a subsequently fired string from the location of a previously fired string.

In other embodiments, the sequence generator can include an algorithm that generates a firing sequence to fire a first string having solid state lighting devices that emit light in a first dominant wavelength and a second string having solid state lighting devices that emit light in a second dominant wavelength, where the second string is fired after the first string.

In yet other embodiments, the sequence generator can include an algorithm that generates a sequence to simultaneously fire a first string having solid state lighting devices that emit light in a first dominant wavelength and a second string having solid state lighting devices that emit light in a second dominant wavelength.

In further embodiments, the sequence generator can generate a random sequence of firing.

Yet further embodiments can include bars that include portions of the strings and extend across the panel in the first direction and are positioned adjacent one another in the second direction. Some embodiments can include a firing sequence that is configured to simultaneously fire a first portion of the strings and then a second portion of the strings where the first portion is located on a first bar and the second portion is located on a second bar. Other embodiments can include a firing sequence that simultaneously fires a first string on a first bar and a second string on a second bar. In some embodiments the first string can include solid state lighting devices that emit light in a first dominant wavelength and the second string can include solid state lighting devices that emit light in a second dominant wavelength.

Yet other embodiments can include a first portion of strings that include solid state lighting devices that emit light in a first dominant wavelength and a second portion of the strings that include solid state lighting devices that emit light in a second dominant wavelength where each of the bars includes at least one string of the first portion of strings and at least one string from the second portion of strings. In further embodiments, the firing sequence can be operative to cause the first portion of strings to fire in a first sequence and then to cause the second portion of strings to fire in the first sequence.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION OF EMBODIMENTS OF THE INVENTION

Figure 1:
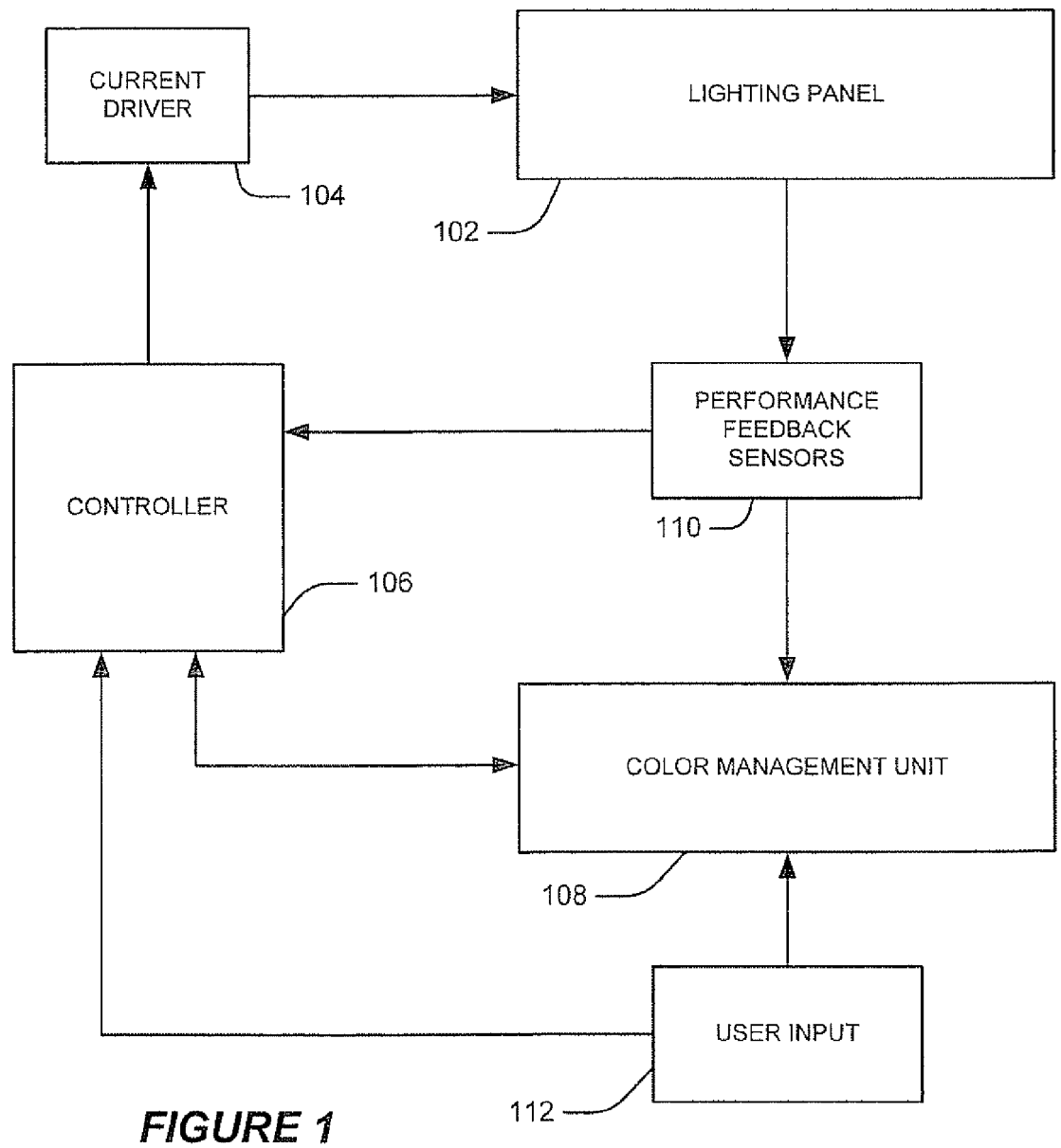
FIG. 1 is a block diagram illustrating an overview of systems and methods for controlling a solid state lighting panel in accordance with some embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will also be understood that when a first element, operation, signal, and/or value is referred to as "responsive to" another element, condition, signal and/or value, the first element, condition, signal, and/or value can exist and/or operate completely responsive to or partially responsive to the other element, condition, signal, and/or value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to flowchart illustrations and/or block diagrams of methods, systems and computer program products according to embodiments of the invention. It will be understood that some blocks of the flowchart illustrations and/or block diagrams, and combinations of some blocks in the flowchart illustrations and/or block diagrams, can be implemented by computer program instructions. These computer program instructions may be stored or implemented in a microcontroller, microprocessor, digital signal processor (DSP), field programmable gate array (FPGA), a state machine, programmable logic controller (PLC) or other processing circuit, general purpose computer, special purpose computer, or other programmable data processing apparatus such as to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Some embodiments of the invention may arise from the recognition that where emitter strings in a panel are fired in a spatially sequential order, a noticeable "sweep" or "waterfall" across the display may result. This effect can be more exaggerated at a beat frequency that is related to the difference between the refresh frequency of the panel and the pulse-width-modulation (PWM) frequency of a pulse-width modulation signal used to adjust the brightness of the display. Accordingly, some embodiments establish a non-spatially sequential firing order to avoid or reduce the formation of a "sweep" across the panel. A lighting panel system can utilize a control system that selectively provides control signals to selectively drive the strings in the panel. Some embodiments can use firing logic to determine a firing order in a deterministic manner. Other embodiments can include a sequence generator that generates a firing sequence. Some embodiments can include a polyphase power supply configured to provide power to emitter strings in a temporally distributed manner. Some embodiments include receiving a synchronizing signal from a display controller. Moreover, in some embodiments, the subsequent firing of a string can be determined by the location and/or dominant wavelength of a previously fired string. In this manner, a noticeable "sweep" effect can be reduced.

Reference is now made to FIG. 1, which is a block diagram illustrating a high level view of systems and methods for controlling a solid state lighting panel in accordance with some embodiments of the invention. A solid state lighting panel 102 can be driven by a current driver 104 that is configured to provide current to light emitting devices in the lighting panel 102. Control of the display can be achieved by controlling the current provided by the current driver 104, which is responsive to control signals generated by a controller 106. The controller 106, in conjunction with a color management unit 108, can perform the processing tasks necessary to generate the control signals for the current driver 104. The color management unit 108 and/or the controller 106 can use, for example, performance data from display performance feedback sensors 110 and user input 112 to achieve the desired display performance.

Figure 2:
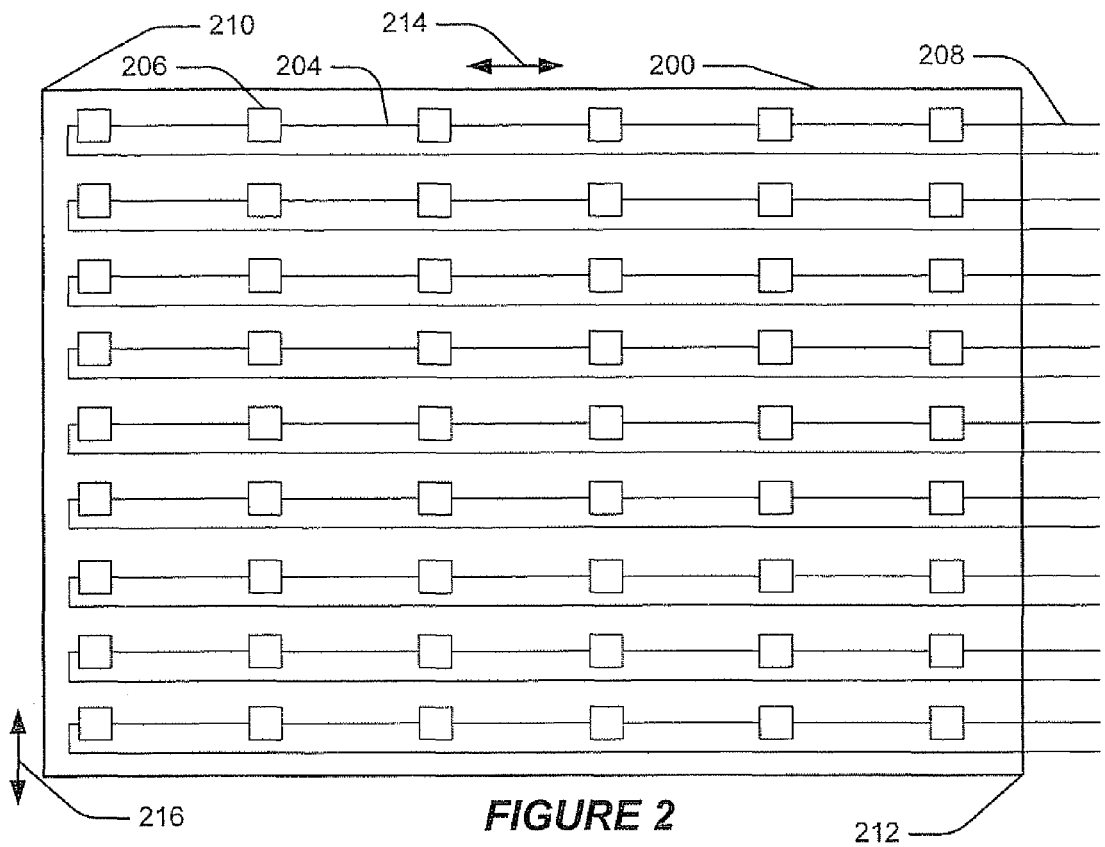
FIG. 2 is a block diagram illustrating a front view of a solid state lighting panel according to some embodiments of the invention.

Reference is now made to FIG. 2, which is a block diagram illustrating a front view of a solid state lighting panel 200 according to some embodiments of the invention. The lighting panel 200 includes multiple strings 204 of solid state lighting devices 206. Although discussed in the context of strings 204, embodiments of the systems and methods herein may include firing modules and/or groups of modules of solid state lighting devices 206 that are not arranged as strings. In some embodiments, a string 204 may be defined by the electrical and/or the spatial relationship between the solid state lighting devices 206 therein. The strings 204 can be generally arranged to extend across the panel 200 in a first direction 214 from a first edge 210 to a second edge 212. The strings 204 can be positioned at intervals along a second direction 216. In some embodiments the strings 204 can be positioned substantially parallel to one another. In some other embodiments the first direction 214 can be substantially orthogonal to the second direction 216. The strings 204 can include electrical connection components 208 for providing electrical connectivity to an electrical power source. In some embodiments, the solid state lighting devices 206 are connected in an electrical series configuration to form each string 204. The electrical series configuration permits the solid state lighting devices in any string to be controlled together through electrical current regulation. Although not shown, some embodiments can include strings 204, or portions thereof, having solid state lighting devices 206 that are connected in an electrically parallel configuration where the string 204 can be controlled through, for example, voltage regulation.

Figure 3:
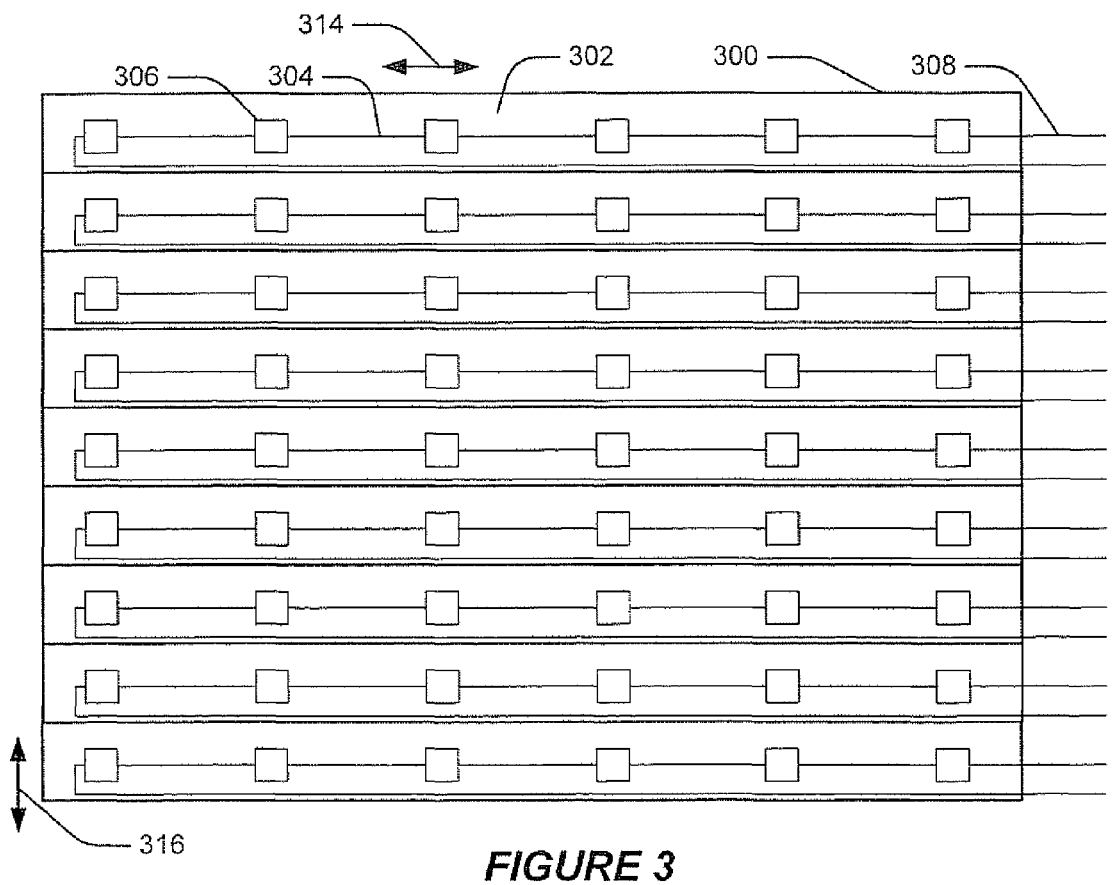
FIG. 3 is a block diagram illustrating a front view of a solid state lighting panel having lighting bars according to some embodiments of the invention.

Reference is now made to FIG. 3, which is a block diagram illustrating a front view of a solid state lighting panel 300 having bars 302 according to some embodiments of the invention. In some embodiments, the bars 302 can extend across the panel 300 in a first direction 314 and be positioned adjacent one another in a second direction 316. Each bar 302 can include one or more strings 304 of solid state lighting devices 306 that can be, for example, connected in series. The strings 304 can include electrical connection components 308 for providing electrical connectivity to an electrical power source. The electrical power source can be current and/or voltage regulated, depending on the configuration of the strings. A solid state lighting panel of some embodiments can include bars 302 that are vertically oriented and/or arranged in a variety of row and column configurations. Moreover, bars can be configured in a combination of different sizes and/or shapes within the same panel 300.

Figure 4:
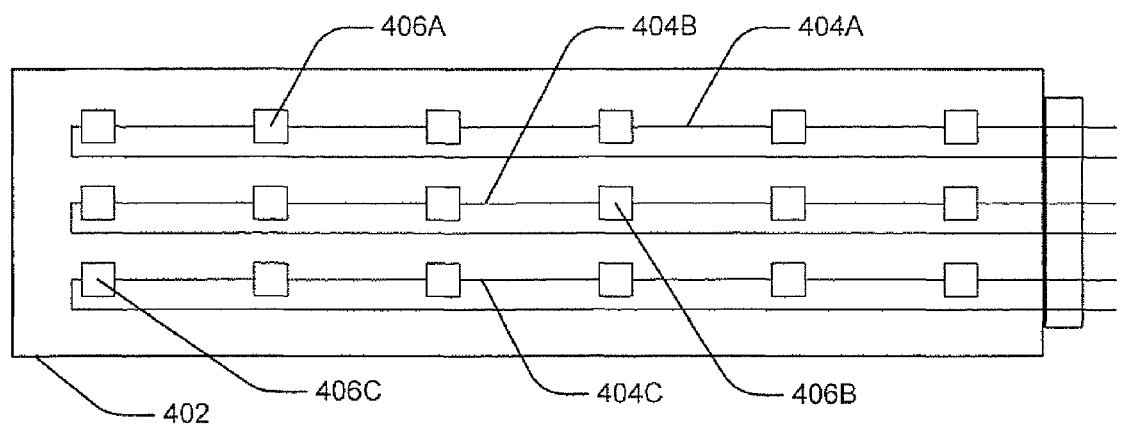
FIG. 4 is a block diagram illustrating a front view of a lighting bar as illustrated in FIG. 3 according to some embodiments of the invention.

Reference is now made to FIG. 4, which is a block diagram illustrating a front view of a bar 402 according to some embodiments of the invention. In some embodiments, a bar 402 can include multiple strings 404A-C that can each include multiple solid state lighting devices 406A-C. Each string 404 can be configured to be substantially the same or each one can differ in one or more ways. In some embodiments, each string 404A-C includes solid state lighting devices 406A-C that emit light in a different dominant wavelength. For example, solid state lighting devices 406A can be configured to emit light having a dominant wavelength generally corresponding to the color red. Similarly, solid state lighting devices 406B and 406C can be configured to emit light having dominant wavelengths corresponding to the colors green and blue, respectively. A bar 402 of some embodiments can include one and/or more strings 404 having solid state lighting devices 406 of different colors. For example, a bar 402 can include at least one string 404 having red solid state lighting devices, at least one string 404 having green solid state lighting devices, and at least one string 404 having blue solid state lighting devices. In this manner, by selectively controlling the amount and/or duty cycle of current supplied to each string, the color hue and/or brightness of the light emitted by the bar can be controlled. The strings 404A-C can be controlled independent of one another or as a group corresponding to the bar 402. Although discussed with reference to solid state lighting devices configured to emit light having different dominant wavelengths, the systems and methods herein may also be utilized in systems using solid state lighting devices configured to emit light in a single dominant wavelength. Furthermore, systems, etc., may use solid state LED's including phosphors that, when energized, emit light having multiple wavelengths and/or that otherwise emit broad spectrum light. such as, for example, a phosphor coated blue LED.

Figure 5:
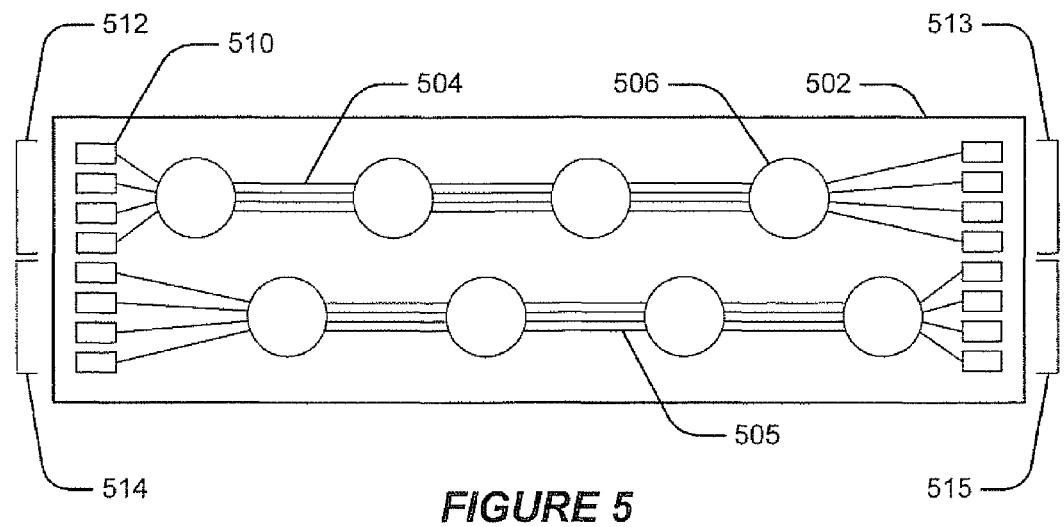
FIG. 5 is a block diagram illustrating a lighting tile according to some embodiments of the invention.
Figure 6:
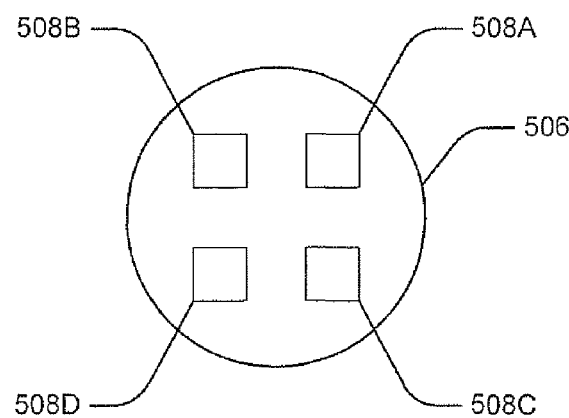
FIG. 6 is a block diagram illustrating a light emitter cluster according to some embodiments of the invention.

Reference is now made to FIG. 5, which is a block diagram illustrating a tile 502 according to some embodiments of the invention. Multiple tiles 502 can be connected to form a bar. The tile 502 can include a first group of strings 504 and a second group of strings 505, each including multiple light emitter clusters 506. As illustrated in FIG. 6, which is a block diagram illustrating a light emitter cluster 506 according to some embodiments of the invention, a light emitter cluster 506 can include multiple solid state light emitters 508A-D. The solid state light emitters 508A-D can each emit light in a different dominant wavelength. For example, the solid state emitter cluster 506 can include a red emitter 508A, a first green emitter 508B, a second green emitter 508C and a blue emitter 508D. other colors of emitters and/or color combinations may be used.

As illustrated in FIG. 5, current can be conducted to the strings through contacts 510. For example, any one or more of the first group of strings can be fired through the first group supply current contacts 512 and the first group return current contacts 513. Similarly, any one or more of the second group of strings 505 can be fired through the second group supply current contacts 515 and the second group return current contacts 514.

Figure 7:
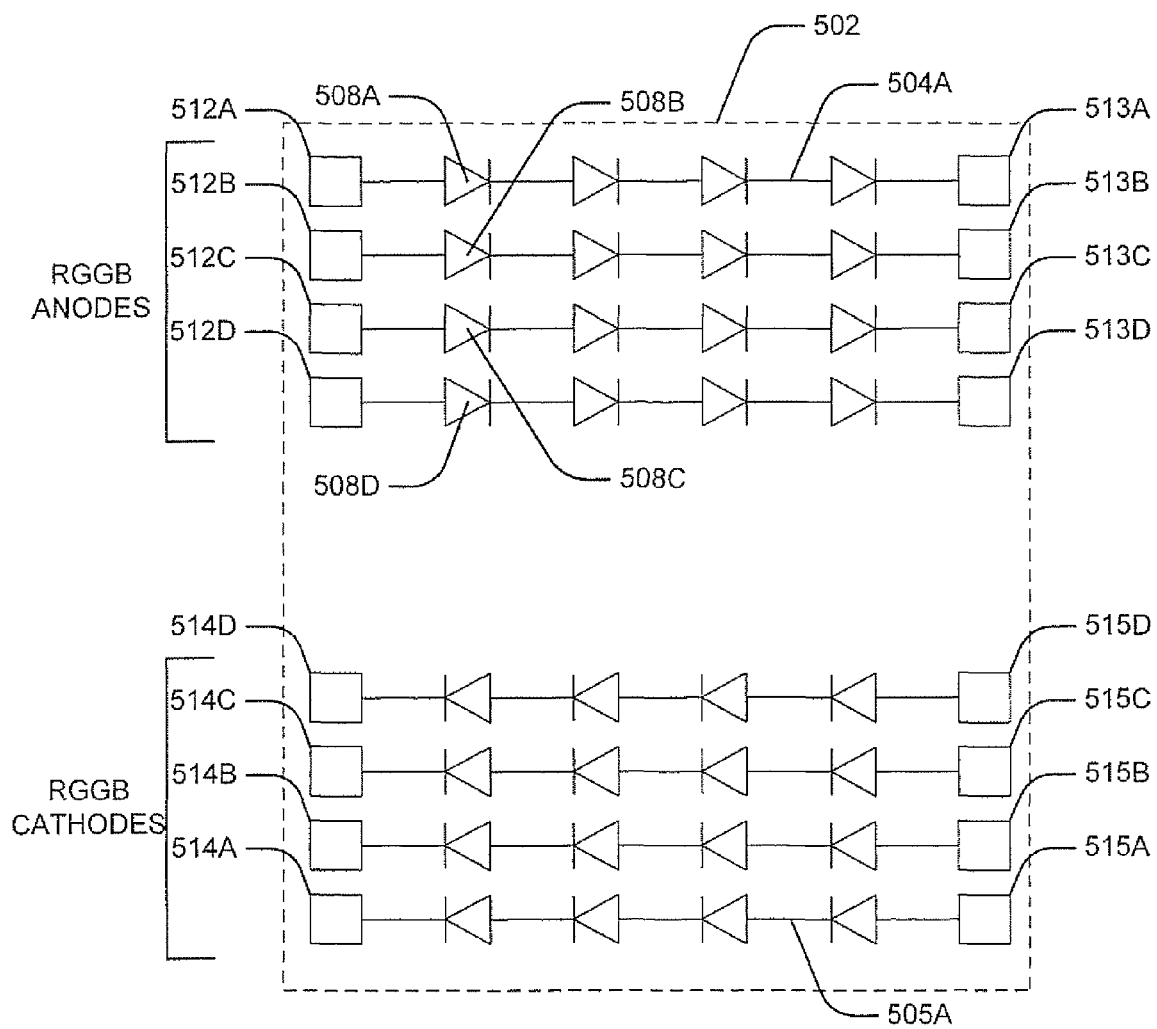
FIG. 7 is a schematic diagram of a lighting tile illustrated in FIG. 5 according to some embodiments of the invention.

Reference is now made to FIG. 7, which is a schematic diagram of a tile as discussed above regarding FIG. 5 according to some embodiments of the invention. The tile 502 includes the first group of strings 504A-D having corresponding current supply and return contacts 512A-D and 513A-D, respectively. Each string 504 can include solid state lighting devices 508 configured to emit light in a dominant wavelength. For example, string 504A can include red emitters 508A. Other strings can include emitters configured to emit light in different dominant wavelengths or colors. In some embodiments a group of strings 504 can include one or more strings having red emitters 508A, one or more strings having green emitters 508B, 508C, and one or more strings having blue emitters 508D. In some embodiments, the first group of strings 504 can be arranged to include the emitter string anodes 512 on the same side of the bar 502 as the emitter string cathodes 514 of the second group of strings 505.

Figure 8:
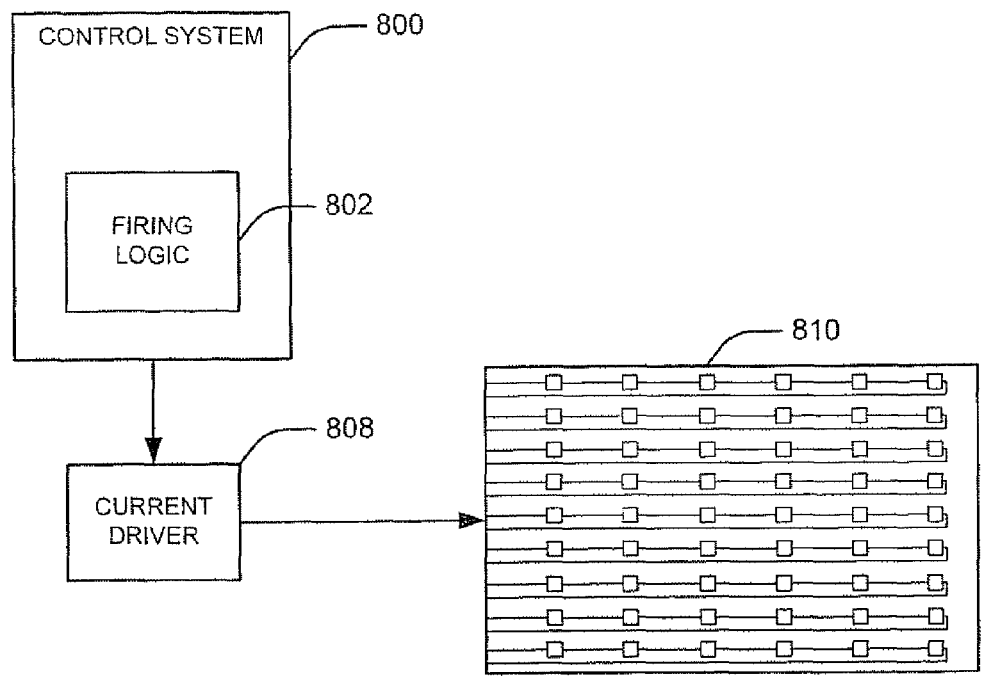
FIG. 8 is a block diagram illustrating systems and methods for controlling a solid state lighting panel in accordance with some embodiments of the invention.

Reference is now made to FIG. 8, which is a block diagram illustrating systems and/or methods for controlling a solid state lighting panel in accordance with some embodiments of the invention. A control system 800 selectively provides control signals to a current driver 808 or other type of electrical power supply circuit that responsively drives multiple solid state lighting devices in a solid state lighting panel 810. The control system 800 can include firing logic 802 that can determine a firing order for the multiple strings. A firing order may determine an order in which individual strings of solid state lighting devices and/or groups of strings of solid state lighting devices are supplied current. In some embodiments, the firing order may determine the order in which strings are fired within a single phase of a power supply. In the single phase context, the temporal delay between firing consecutively fired strings may be on the order of, for example, several microseconds. In some embodiments, the firing order may determine the firing order of strings supplied power from different phases of a polyphase power supply. In the polyphase context, the temporal delay between firing strings using consecutive power supply phases may be on the order of, for example, milliseconds.

One common method for controlling the current driven through the strings is a Pulse Width Modulation (PWM) scheme. PWM schemes pulse the solid state lamps alternately to a full current "ON" state followed by a zero current "OFF" state. The output of the string may be controlled by varying the duty cycle, which is the percent of the cycle that the string is placed in an "ON" state.

In some embodiments, the firing logic 802 can include rule-based logic that can generate a non-spatially-sequential firing order. For example, the rule based logic may include a rule that a second string fired after a first string is not adjacent the first string in the panel 810. In some embodiments, a rule may be that the first and second strings can be fired simultaneously and are not adjacent one another.

In some embodiments, the solid state lighting panel 810 can also include multiple bars, as discussed above regarding FIG. 3, that can extend across the panel in a first direction and that can be positioned adjacent one another in a substantially parallel arrangement. The firing order can be operative to fire different strings based on the location of the bar that the strings are in. For example, the firing order may be such that each subsequently fired string is located in a bar on a different side of the previously fired string. For example, where first, second, and third strings are fired sequentially, the second string can be in a bar below that of the first string and the third string can be in a bar above that of the second string.

The panel 810 of some embodiments can include different portions of the strings that include solid state lighting devices that emit light in different dominant wavelengths. Some embodiments include at least one string of each dominant wavelength in each of the bars. The strings of a first dominant wavelength can be fired in the firing order and then the strings of a second dominant wavelength can be fired in the firing order. The firing order can be repeated for each of the portions of strings. In some embodiments, the string of a first dominant wavelength can be fired simultaneously with a string of a second dominant wavelength. Where the strings of first and second wavelengths are fired sequentially, the firing order can be used to determine the location of a second bar based on the location of the first bar.

The firing logic of some embodiments can also use random logic to generate the firing order. The random logic can be applied as to the bars where some or all of the strings on a bar are fired simultaneously and the bar that is fired is determined using random logic. For example, in a panel 810 having nine bars, a first fired bar determined by random logic may be bar number three, counting from top to bottom. The second fired bar can be randomly selected from remaining bars one, two, and four through nine. If the random logic selects bar number six for the second firing, the third fired bar is randomly selected from the remaining bars one, two, four, five, and seven through nine. Similarly, the random logic can be applied to individual strings.

Some embodiments can also include means for generating a feedback signal that can provide display performance information to the control system 800. The means can include performance sensors, such as thermal sensors and color sensors, among others.

Figure 9:
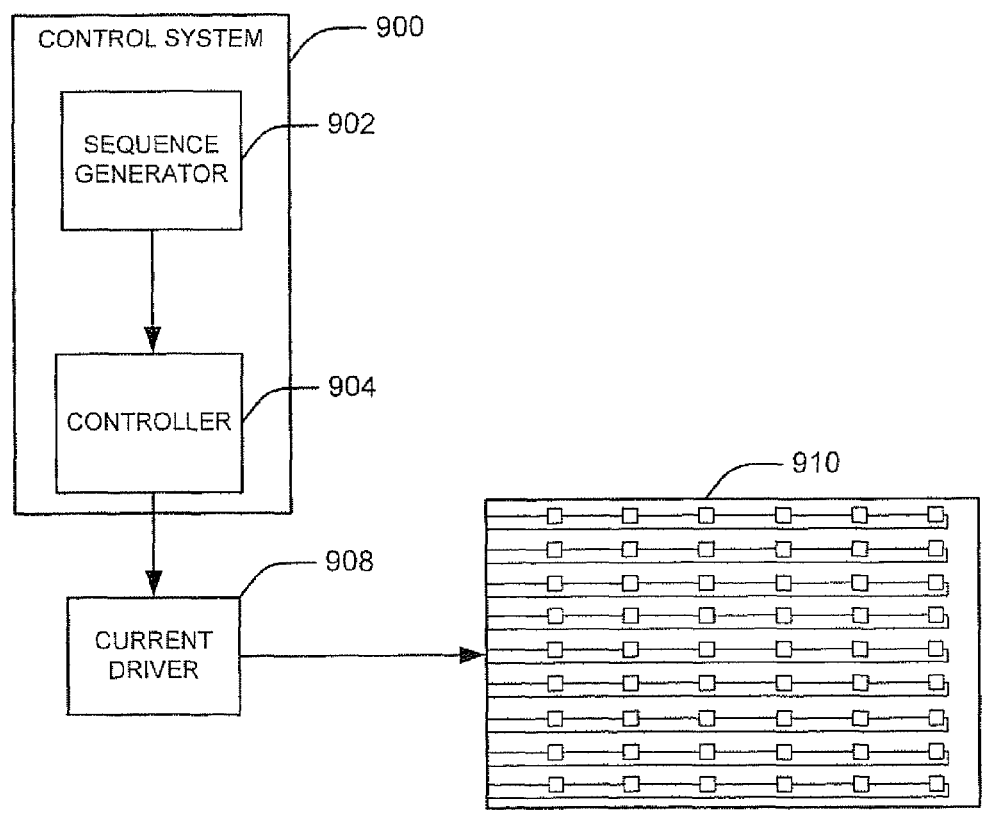
FIG. 9 is a block diagram illustrating systems and methods for controlling a solid state lighting panel in accordance with other embodiments of the invention.

Reference is now made to FIG. 9, which is a block diagram illustrating systems and methods for controlling a solid state lighting panel according to some other embodiments of the invention. A system 900 for controlling a solid state lighting panel 910 that includes multiple strings of solid state lighting devices can include a sequence generator 902 that can generate a firing sequence for firing the multiple strings in the panel 910. The firing sequence is received by a controller 904 that can provide control signals to a current driver 908. The current driver 908 can selectively provide current to the multiple strings in the panel 910.

The sequence generator 902 can include a deterministic algorithm that determines the location and/or identity of a subsequently fired string based on the location of a previously fired string. In some embodiments, the deterministic algorithm can use locations of multiple previously fired strings to select the next string to be fired. The sequence generator 902 of some embodiments can generate a sequence where a first fired string includes solid state lighting devices that emit light in a first dominant wavelength and then a second fired string includes solid state lighting devices that emit light in a second dominant wavelength. Other embodiments can simultaneously fire two and/or more strings having solid state lighting devices that emit light in different dominant wavelengths. The sequence generator 902 can also generate a random firing sequence that can fire the strings in a random sequence based on location and/or dominant wavelength.

The system can include multiple bars that each include a portion of the strings, such that the bars extend across the panel in a first direction and are positioned adjacent one another in a second direction. In some embodiments, the first direction and the second direction can be substantially orthogonal. The firing sequence can cause the simultaneous firing of the portion of strings on one bar at a time. The firing sequence can also cause a simultaneous firing of one or more strings on one bar and one or more strings on another bar. In some embodiments, the simultaneously fired strings can include solid state lighting devices that emit light in more than one dominant wavelength. For example, a first string can emit light in a first dominant wavelength and a second string can emit light in a second dominant wavelength. Further, a single string can include different solid state lighting devices that emit light in different dominant wavelengths.

Figure 10:
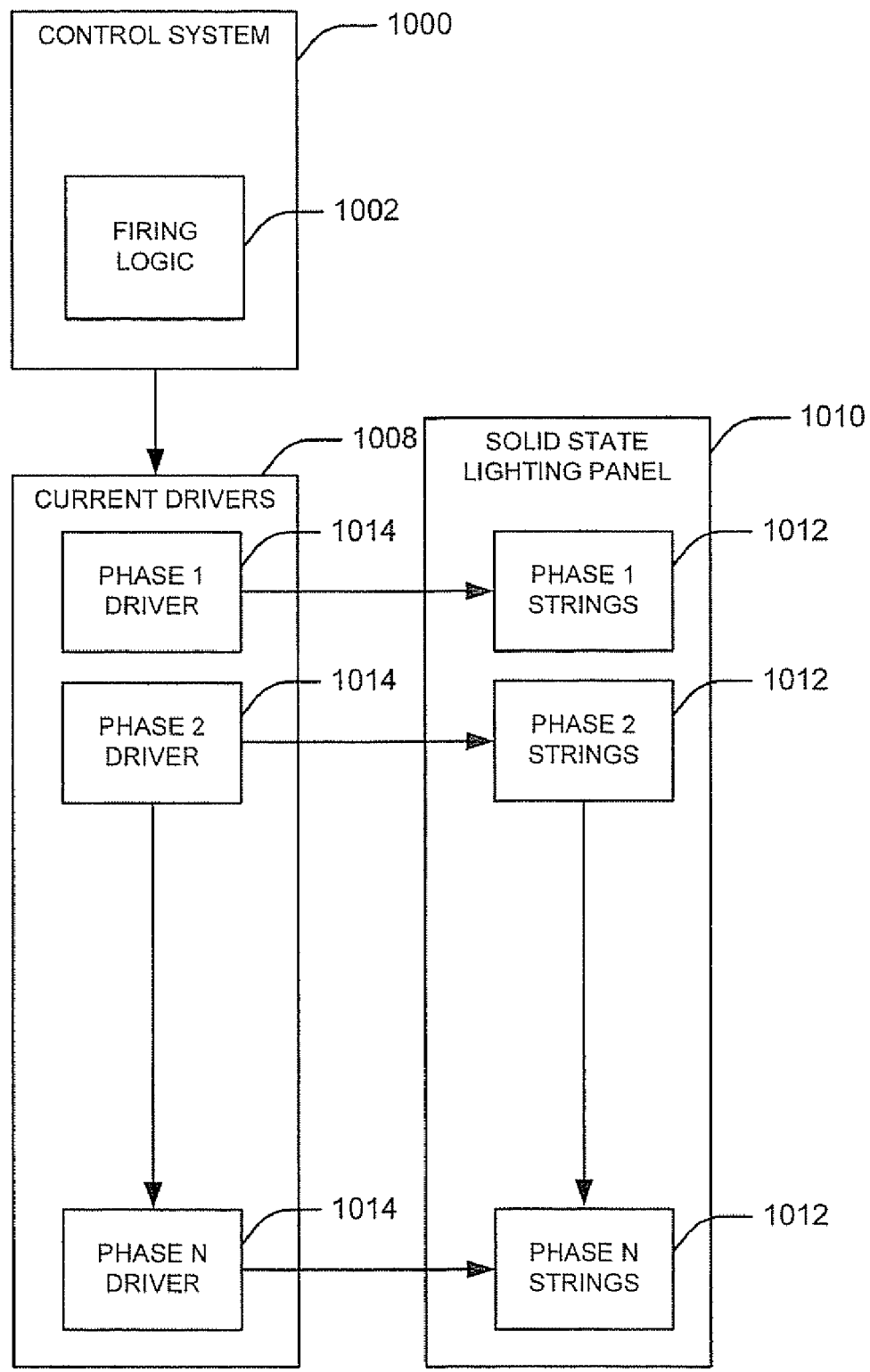
FIG. 10 is a block diagram illustrating systems and methods for controlling a solid state lighting panel using a multiple phase power supply in accordance with some embodiments of the invention.

Reference is now made to FIG. 10, which is a block diagram illustrating systems and methods for controlling a solid state lighting panel using a multiple phase power supply in accordance with some embodiments of the invention. A control system 1000 selectively provides control signals to a current drivers 1008 or other type of electrical power supply circuit that responsively drives multiple solid state lighting device strings 1012 in a solid state lighting panel 1010. The control system 1000 can include firing logic 1002 that can determine a firing order for the multiple strings. In some embodiments, the firing logic 1002 can include rule-based logic that can generate a non-spatially-sequential firing order. In some embodiments, the firing logic 1002 can include a spatially sequential firing order.

The current drivers 1008 can include multiple phase drivers 1014 corresponding to N different power phases, for example. Each of the phase drivers 1014 is configured to provide power to one or more different strings 1012 corresponding to that phase. For example, a solid state lighting panel 1010 may include twenty-seven strings that are powered by nine different phase drivers 1014. In this manner, each phase driver 1014 can provide power to three phase strings 1012. The firing order of the strings 1012 within each phase group may be configured to be non-spatially sequential. Further, the determination regarding which strings 1012 are in each phase group may also be non-spatially sequential.

By providing multiple phases, each phase driver 1014 can be configured to begin firing at a different time within the period, as determined by, for example, the firing logic. In this manner, the firing of the strings 1012 can be performed in a more uniform manner within each period. By temporally displacing the firing of the different strings 1012 using multiple phase drivers 1014, the peak dynamic power load may be reduced, which may reduce the power modulation. Reducing the power modulation may improve the performance consistency of other electrical components in a system, such as, for example, LCD drivers in a display. For example, reductions in the magnitude and duration of peak-to-peak power load changes may result in reduced output differences in the LCD display drivers that result therefrom.

Further advantages may also be realized including, for example, a reduction in electromagnetic interference (EMI), a reduction in radio frequency interference (RFI), and/or an increase in system circuit response that may be achieved by reducing the size of a power supply output filter. Since large bursts of EMI/RFI associated with large deviations in power transmission may result in higher susceptibility requirements for other system components, a reduction in EMI/RFI may be advantageous. Additionally, as the quantity of phases per string increases, the current per phase decreases, which may further reduce EMI.

Figure 11A:
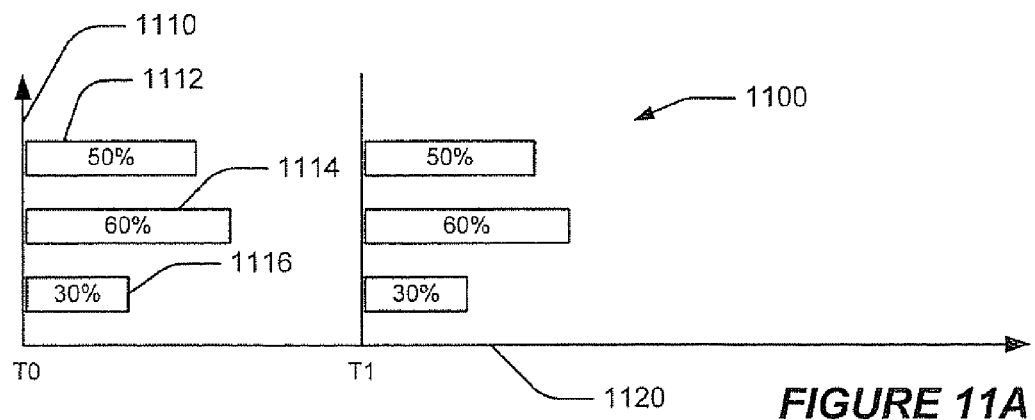
FIGS. 11A and 11B illustrate a timing diagram and a corresponding graph of a dynamic power load, respectively, for systems and methods of using a single phase power supply for controlling a solid state lighting panel in accordance with some embodiments of the invention.
Figure 11B:
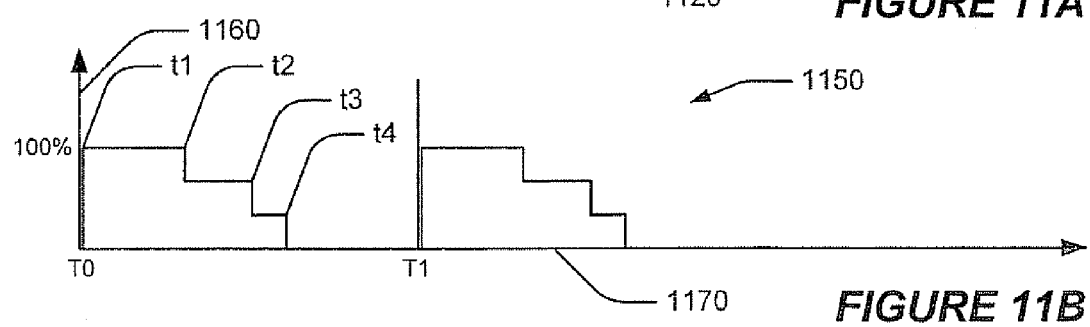

Reference is now made to FIGS. 11A and 11B, which illustrate a timing diagram and a graph of a corresponding dynamic power load, respectively, for systems and methods of using a single phase power supply for controlling a solid state lighting panel in accordance with some embodiments of the invention. The timing diagram 1100 plots the string groups 1110 versus time 1120, which is divided into periods T0 and T1 that may correspond to, for example, cycles in an alternating current (AC) power system. For example, in a sixty Hertz power system, each period is approximately 16.67 milliseconds. The string groups 1110 may include one or more strings of solid state light emitters.

When driven using a single phase power supply, the string groups 1110 will begin firing near the beginning of the period. Each string group 1110 may stop firing at a different time, depending on the duty cycle determined for that particular string group 1110. For example, a first string group 1112 may have a duty cycle of 50%, which means that the string group 1112 will be driven for approximately 50% of the length of the period. Similarly, a second string group 1114 may have a 60% duty cycle and a third string group 1116 may have a 30% duty cycle.

Referring to FIG. 11B, which plots the percentage of maximum power versus time, the power load is 100% of maximum when all of the string groups 1110 fire at time t1 near the beginning of the period. At time t2, the third string 1116 turns off, which reduces the power load to 66.7% of maximum. At time t3, the second string 1114 turns off, which reduces the power load to 33.3% of maximum and at time t4, the first string 1112 turns off, which drops the power load to 0. In this manner, the dynamic power load cycles between 0 and 100% each period. Moreover, since the duration of the high and low values of power load are each significant portions of the period, attempts at improving the dynamic power load through filtering may have adverse consequences regarding power supply response. Although, for illustration purposes, it is assumed that strings consume the same amount of power, this may generally not be the case. For example, a red string may consume more power than a blue string, which may consume more or less power than a green string.

Figure 12A:
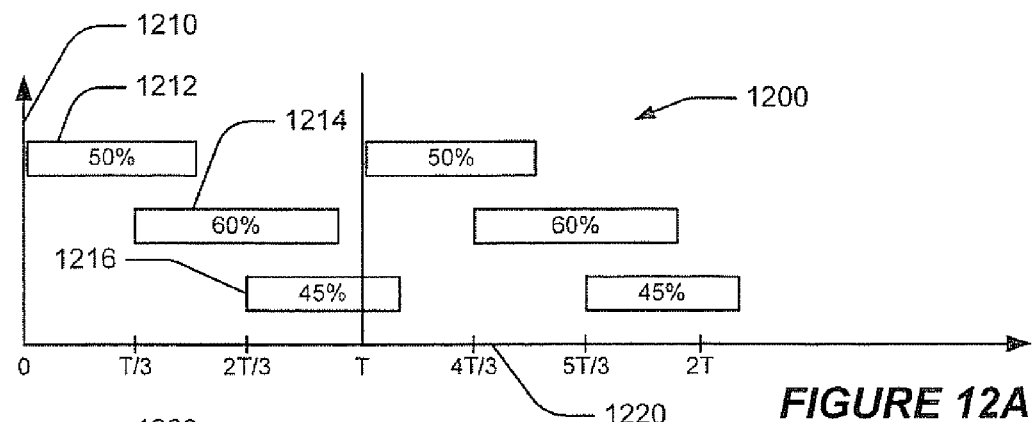
FIGS. 12A and 12B illustrate a timing diagram and a corresponding graph of a dynamic power load, respectively, for systems and methods of using a multiple phase power supply for controlling a solid state lighting panel in accordance with some embodiments of the invention.
Figure 12B:
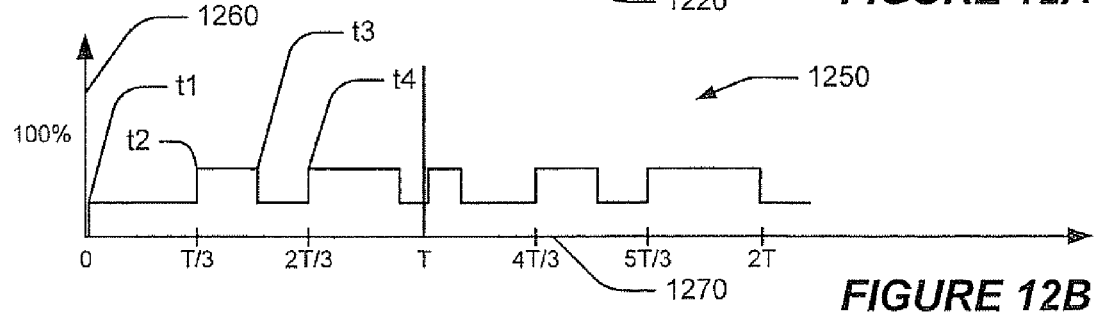

Reference is now made to FIGS. 12A and 12B, which are a timing diagram and a graph of a corresponding dynamic power load, respectively, illustrating systems and methods of using a multiple phase power supply for controlling a solid state lighting panel in accordance with some embodiments of the invention. The timing diagram 1200 plots the string groups 1210 versus time 1220, which is divided into periods T and multiples thereof. The string groups 1210 may include one or more strings of solid state light emitters. Although illustrated as three phases and string groups, multiple phase embodiments may include any number of phases from 2 up to the number of strings and/or groups of emitters.

When driven using a multiple phase or polyphase power supply, the string groups 1210 will begin firing at predetermined times throughout the period T such that the dynamic power loading may be reduced by shifting some of the power load to the later portion of the period. In contrast with the string groups discussed above regarding FIG. 11A, the string groups 1210 may be started at different times to eliminate the case where all string groups are firing during the first portion of the period. For example, in the case of three strings and/or groups of strings, a period T may be subdivided into three substantially equal portions. For example, a first string group 1212 may be configured to operate at a 50% duty cycle and fire near the beginning of the period 0. Similarly, a second string group 1214 may be configured to fired at a 60% duty cycle after T/3 time units and a third string group 1216 may be configured to fire at a 45% duty cycle after 2T/3 time units in the period. Thus, the first string group 1212 fires at the beginning of the first third of the period, the second string group 1214 fires at the beginning of the second third of the period and the third string group 1216 fires at the beginning of the final third of the period. This pattern continues for each subsequent period such that each string fires at a predetermined time during each period.

Referring to FIG. 12B, which plots the percentage of the single phase maximum power versus time, the power load is 33.3% when the first string group 1212 fires at time t1 near the beginning of the period. At time t2, the second string group 1214 begins firing, which increases the power load to 66.7%. At time t3, the first string group 1214 turns off, which drops the power load to 33.3%. At time t4, the third string group 1216 fires, which increases the power load back to 66.7% until near the end of the period, when the second string group 1214 turns off. The power load continues at 33.3% into the next period until the first string group 1212 turns on again, which increases the power load back to 66.7%. The dynamic power load modulates between 33.3% and 66.7% of the single phase maximum power each period. By reducing the magnitude of the peak to peak dynamic loads the effectiveness of power supply filters such as capacitors can be improved.

Although illustrated and discussed relative to 100% of the single phase maximum power, as may be determined by the power required to fire all string groups simultaneously, in some embodiments, the maximum power load may be determined based on the maximum number of string groups that are fired at any point during a period. Thus, for example, the dynamic power load in the present example may be determined as the quantity of power required to fire two string groups simultaneously. In this manner, the dynamic power load may vary from 50% to 100%, with a brief 0% interval, that may, in some embodiments, be filtered out based on the duration of the interval. Although, as illustrated, the system utilizes three different groups, each driven by a different phase, in some embodiments, a system may use, for example, nine phases to drive, for example, twenty-seven different strings. In this manner, each string group may include three strings. It should be appreciated that as the ratio of phases to strings increases and approaches unity, the dynamic power load may decrease correspondingly. In some embodiments, a polyphase power supply may be used in conjunction with a non-spatially-sequential firing order. Although, for illustration purposes, it is assumed that strings consume the same amount of power, this may generally not be the case. For example, a red string may consume more power that a blue string and/or a green string.

Figure 13A:
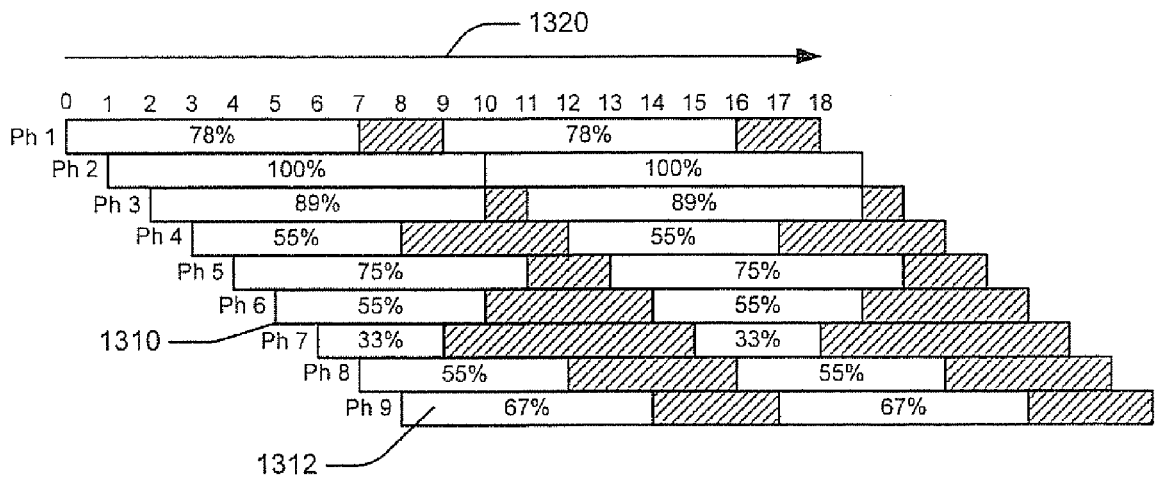
FIGS. 13A and 13B illustrate a timing diagram and a corresponding graph of a dynamic power load, respectively, for systems and methods of using a multiple phase power supply for controlling a solid state lighting panel in accordance with some embodiments of the invention.
Figure 13B:
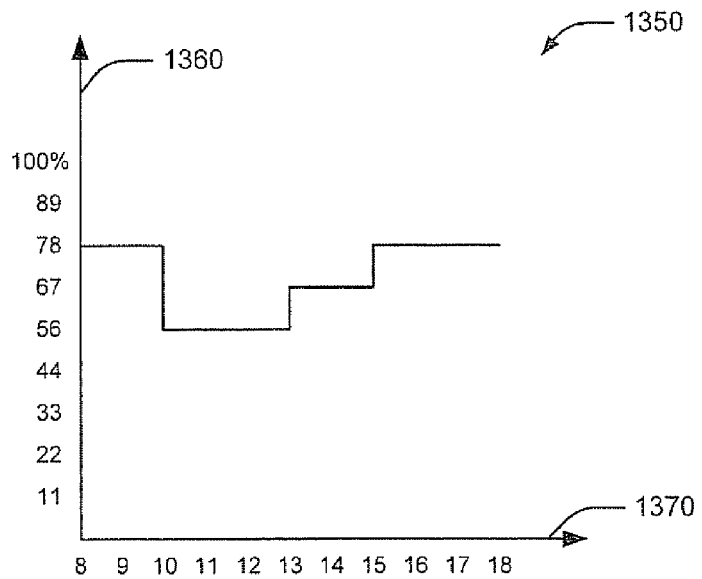

Some embodiments may include providing one phase per string. For example, reference is now made to FIGS. 13A and 13B, which are a timing diagram and a graph of a corresponding dynamic power load, respectively, illustrating systems and methods of using a multiple phase power supply having a phase for each string. By way of example, a display may include nine strings 1310 of solid state light emitters that may each be fired at a different duty cycle 1312. A power supply may be included that can include one phase driver for each of the nine different strings 1310. In this manner, each string may be fired independent of the others. For example, each of the strings 1310 may begin and end firing at different time intervals 1320. In this manner, the dynamic power load, as illustrated in the graph of FIG. 13B, can realize a reduced dynamic range.

Each phase may begin and end at a different time and each string may be driven at a different load factor. In some embodiments, the phases may be temporally separated responsive to the number of different phases. For example, where each cycle has a period of T seconds and there are nine phases, the delay between each successive phase may be T/9 seconds. Two consecutive periods for each of the nine phases is shown to illustrate the resulting dynamic power load during operation. For example, in the firing scheme illustrated in FIG. 13A, the power load is substantially evenly distributed around an average of approximately 67% and deviates plus or minus 11% from the average value.

In some embodiments, timing the firing of the strings may be determined algorithmically and may be dynamically adjusted depending on the state of the system. Different variables within algorithms and/or different algorithms may be used at various levels and/or hues of requested light output. For example, a particular algorithm and/or set of variables may be used to determine the timing of the firing of the strings when the solid state lighting panel is in a minimum output configuration. In some embodiments, a display may include, a greater number of strings and/or phases. For example, a display may include twenty-seven strings that are configured to be driven by nine phases. In some embodiments, a twenty-seven string display may be driven by twenty-seven phases. Although, for illustration purposes, it is assumed that strings consume the same amount of power, this may generally not be the case.

Figure 14:
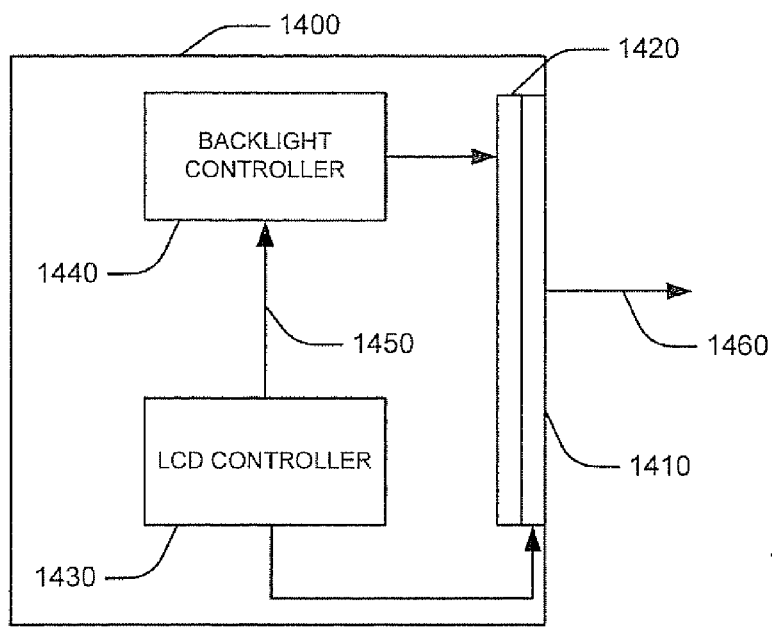
FIG. 14 is a block diagram illustrating systems and methods for controlling a solid state lighting panel synchronized with an LCD display in accordance with other embodiments of the invention.

Reference is now made to FIG. 14, which is a block diagram illustrating systems and methods for controlling a solid state lighting panel synchronized with an LCD display in accordance with other embodiments of the invention. A display device 1400 may include an LCD panel 1410, including a two-dimensional arrangement of liquid crystal shutters, that is controlled by an LCD controller 1430. The LCD controller 1430 may control the output image 1460 by varying on/off values of the LCD shutters corresponding to different color pixels. Since an output image 1460 may typically include dynamic content, the LCD controller 1430 may be configured to refresh the pixels at a predetermined refresh rate.

The LCD panel 1410 relies on dynamic light transmission to control an output image 1460 so the display device 1400 may also include a solid state backlight panel 1420 configured to provide light to be selectively transmitted through the shutters of the LCD panel 1410. A solid state backlight panel 1420 may include multiple strings of solid state light emitters that can be controlled to achieve a desired color hue and/or luminous intensity. Varying the output of a string may be accomplished, for example, by firing the string for a portion of a period, which may be controlled by a backlight controller 1440. In some embodiments, the refresh rate of the LCD controller 1430 may be synchronized with the firing of the solid state backlight panel 1420 by sending a synchronizing signal from the LCD controller to the backlight controller 1440. In this manner, unwanted effects due to the interference of non-synchronized processes operating at different frequencies may be reduced. Synchronized display and backlighting may be used in conjunction with single phase power supply systems and/or polyphase power supply systems. Additionally, synchronization may be used in conjunction with a non-spatially-sequential firing order.

Figure 15:
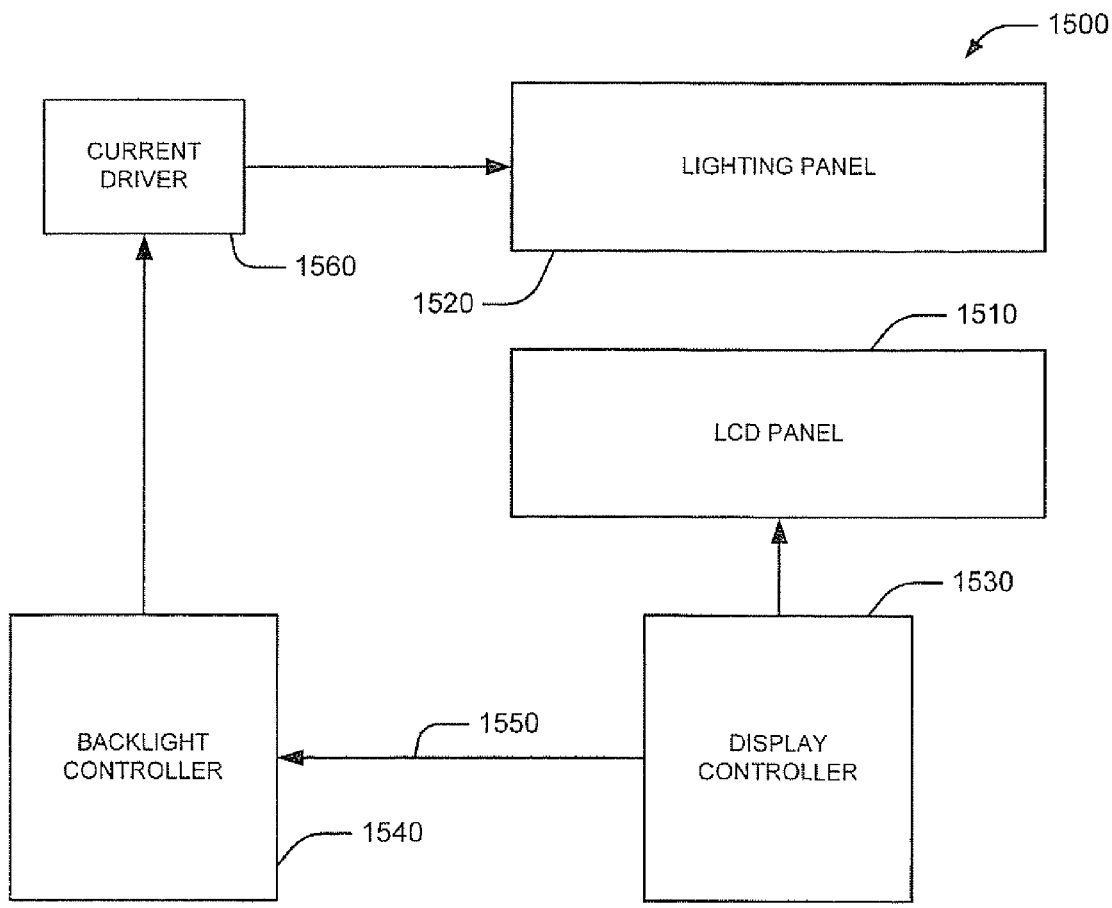
FIG. 15 is a flow diagram illustrating operations for controlling a solid state lighting panel synchronized with an LCD display in accordance with other embodiments of the invention.

Reference is now made to FIG. 15, which is a block diagram illustrating systems/methods for controlling a solid state backlighting panel synchronized with an LCD panel in accordance with some embodiments of the invention. An LCD panel 1510 is controlled by a display controller 1530, which refreshes the pixels in the LCD panel 1510 at a predetermined refresh rate. A solid state backlighting panel 1520 may also be included for providing luminance through the LCD panel 1510. The solid state backlighting panel 1520 may be controlled by a backlight controller 1540 that can drive multiple strings of solid state light emitters using a current driver 1560. The output of the solid state backlighting panel 1520 may be controlled by firing the emitters for specific portions of a period. The display controller 1530 may send a synchronizing signal 1550 to the backlight controller 1540 such that the firing rate of the strings corresponds to the refresh rate of the LCD display 1520. In this manner, the visual effects from interference between the refresh rates of the LCD display 1520 and the solid state lighting panel 1510 may be reduced.

Figure 16:
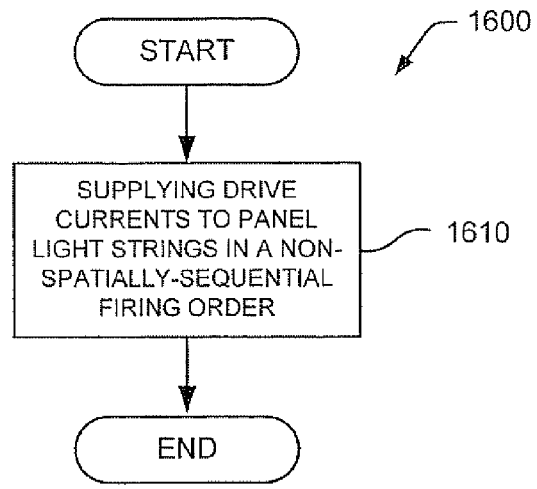
FIG. 16 is a flow diagram illustrating operations for controlling a solid state lighting panel according to some embodiments of the invention.

Reference is now made to FIG. 16, which is a block diagram illustrating systems/methods for controlling a solid state lighting panel according to some embodiments of the invention. The operations 1600 include supplying drive currents to strings in a solid state lighting panel in a non-spatially-sequential firing order (block 1610). The non-spatially-sequential firing order can be accomplished using, for example, a randomly generated firing order or a deterministic firing order. A deterministic firing order can be rule-based and use rules, such as a rule that the directional relationship between a subsequently fired string and a previously fired string alternates with each firing. Some embodiments can include a rule defining the minimum number of bars and/or strings between sequentially and/or simultaneously fired strings. Embodiments can also include a rule that sequentially and/or simultaneously fired strings are non-adjacent and/or are in non-adjacent bars.

Figure 17:
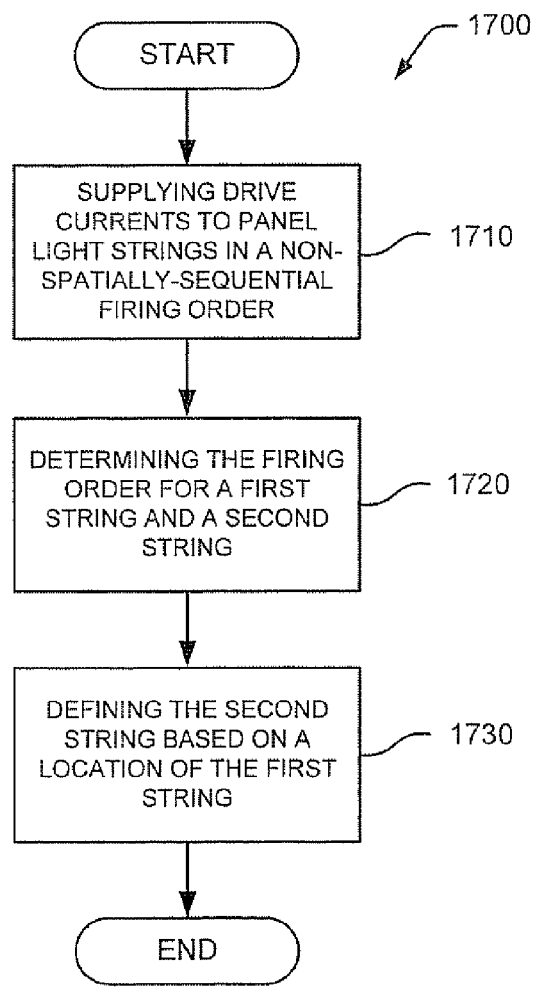
FIG. 17 is a flow diagram illustrating operations for controlling a solid state lighting panel according to other embodiments of the invention.

Reference is now made to FIG. 17, which is a block diagram illustrating systems/methods for controlling a solid state lighting panel according to other embodiments of the invention. The operations 1700 include supplying drive currents to strings of solid state lighting devices arranged in a panel in a non-spatially-sequential firing order (block 1710). A firing order for a first string and a second string is determined (block 1720). The firing order determines the order in which the strings will be supplied current. A second string is defined based on a location of the first string (block 1730). By defining the second string based on the location of the first string, a non-spatially-sequential firing order can be accomplished. In some embodiments the second string can be defined by selecting a string that is non-adjacent the first string and/or is in a bar that is non-adjacent the bar that includes the first string. The second string can also be defined by selecting a string such that a minimum quantity of strings and/or bars are between the first and second strings. A third string can also be defined based on the locations of the first string and the second string. For example, where the second string is in a first direction relative to the first string, the third string is selected to be in a second direction relative to the second string.

Figure 18:
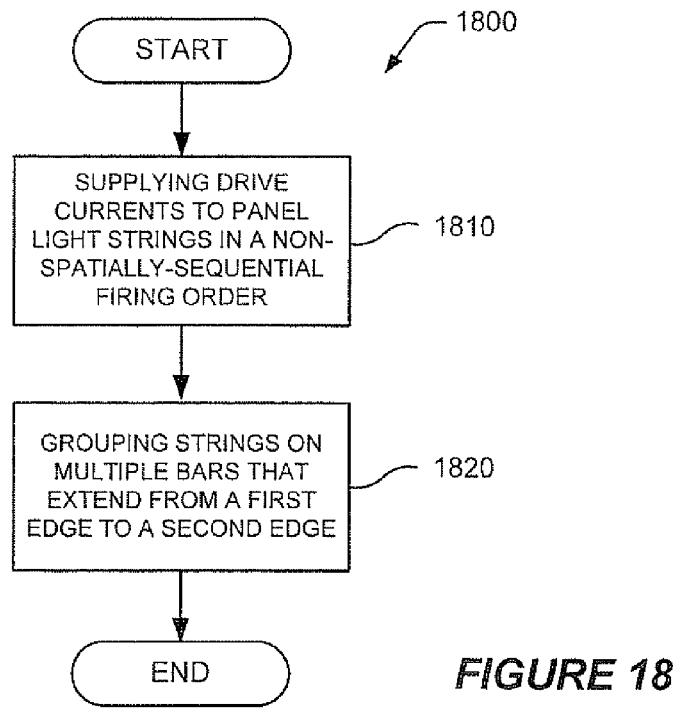
FIG. 18 is a flow diagram illustrating operations for controlling a solid state lighting panel according to further embodiments of the invention.

Reference is now made to FIG. 18, which is a block diagram illustrating systems/methods for controlling a solid state lighting panel according to further embodiments of the invention. The operations 1800 include supplying drive currents to strings of solid state lighting devices in a solid state lighting panel in a non-spatially-sequential firing order (block 1810). The operations can also include grouping the strings on multiple bars that extend from a first edge of the panel to a second edge of the panel (block 1820). The first and second edges can be opposite one another in a panel configured in a rectilinear geometry. The bars can be arranged adjacent one another and can be substantially parallel to one another in some embodiments. Some embodiments include simultaneously supplying current to the portion of strings that are in a same one of the bars. Embodiments can also include simultaneously supplying current to strings located in more than one of the bars. In some embodiments, a random number can be generated, a value can be assigned to each bar, and current can be simultaneously supplied to the strings in the bar having a value corresponding to the random number.

Figure 19:
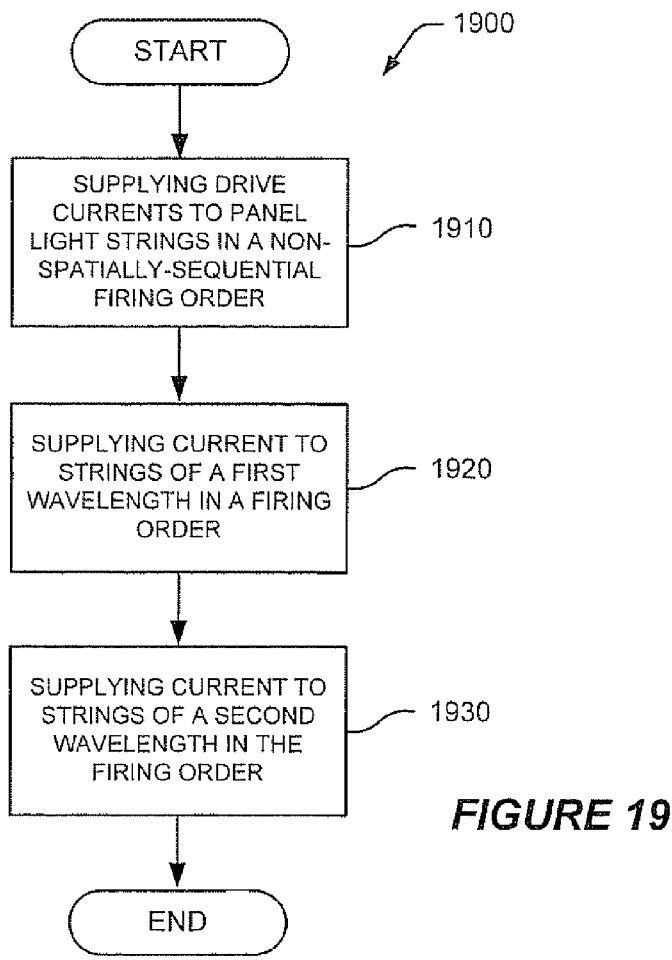
FIG. 19 is a flow diagram illustrating operations for controlling a solid state lighting panel according to yet further embodiments of the invention.

Reference is now made to FIG. 19, which is a block diagram illustrating systems/methods for controlling a solid state lighting panel in yet further embodiments of the invention. The operations 1900 include supplying drive currents to strings of solid state lighting devices in a solid state lighting panel in a non-spatially-sequential firing order (block 1910). The operations can also include supplying current to strings having solid state lighting devices that emit light in a first dominant wavelength in the firing order (block 1920). Embodiments can also include supplying current to strings having solid state lighting devices that emit light in a second dominant wavelength in the firing order (block 1930). In this manner, the strings of a first wavelength are fired in a sequence and then strings of a second wavelength are fired in the sequence.

Figure 20:
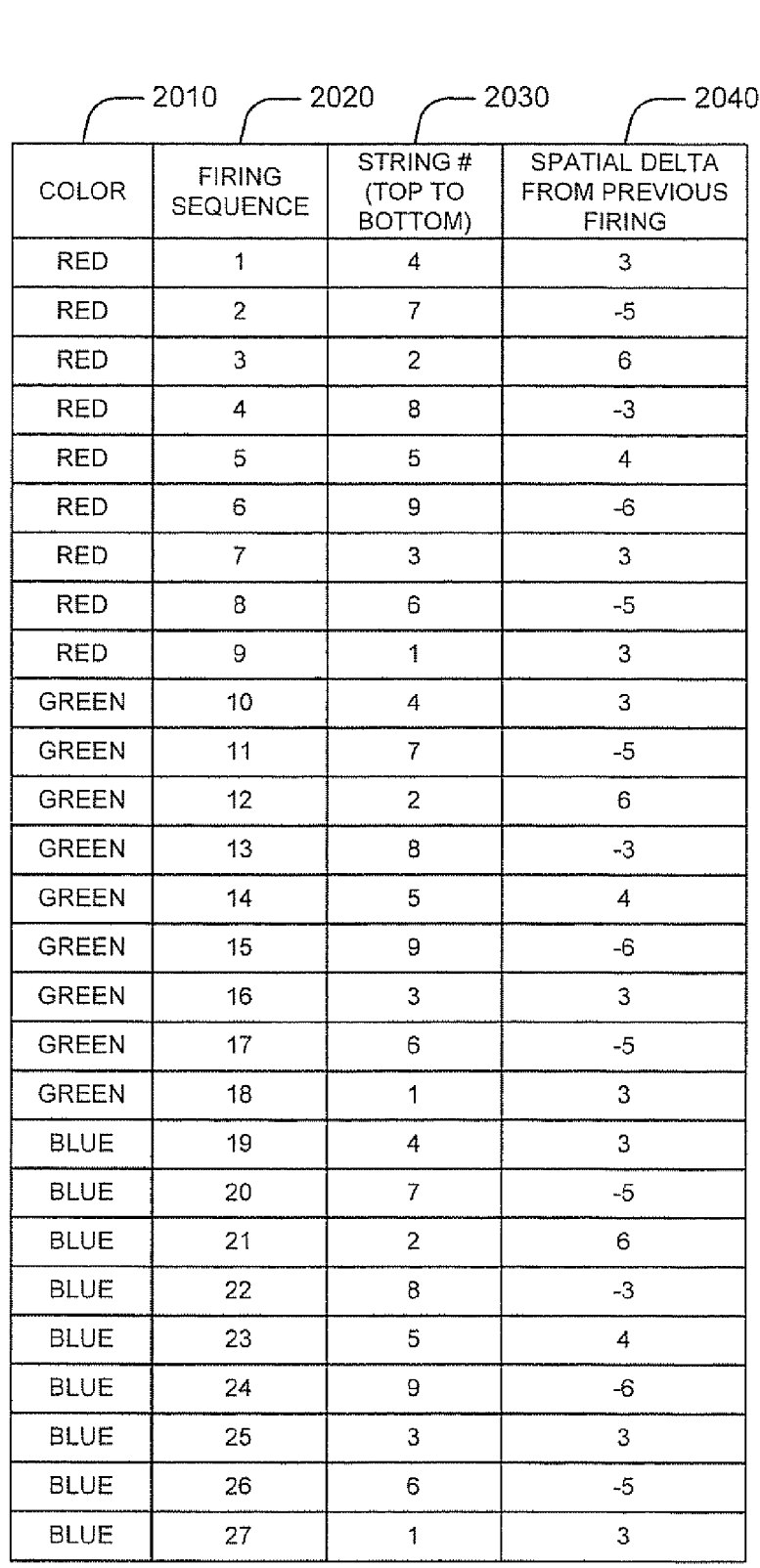
FIG. 20 is a table illustrating an exemplary string firing sequence according to some embodiments of the invention.

Reference is now made to FIG. 20, which is a table illustrating an exemplary string firing sequence according to some embodiments of the invention. The table 2000 corresponds to a sequence for a solid state lighting panel having three different color or wavelength strings at each of nine panel positions. The panel positions, which, in some embodiments, can be bars, are designated as the string number (column 2030) and the color of each string is designated (column 2010). The firing sequence (column 2020) indicates each string's position in the sequence of firing. A spatial delta value for each string lists the number of places between the present string and the last fired string in the sequence and is listed for each string (column 2040). This sequence, for example, provides that the strings of each color are fired as a sequential group and that one color group is fired after another color group. For example, all of the red strings are fired in a location based sequence then all of the green strings are fired in the sequence and then all of the blue strings are fired in the sequence. Note that since no value in the spatial delta column 2040 is less than three, there are no strings fired closer than three positions away from the previously fired string. Further, within each color group, since the spatial delta alternates between positive and negative values, each string fired is located in a different direction relative to the previously fired string from the direction between the previously fired string and its predecessor.

Although some embodiments are described in connection with LCD backlights, embodiments of the invention may be used for other purposes, such as general lighting. In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A lighting panel system, comprising:
a lighting panel including a plurality of strings of solid state lighting devices arranged across the panel in a first direction and positioned at intervals in a second direction that is substantially orthogonal to the first direction;
a current supply circuit configured to selectively supply a plurality of on-state drive currents to the plurality of strings responsive to a plurality of control signals; and
a control system configured to selectively provide control signals to the current supply circuit to selectively drive the plurality of strings, the control system further including firing logic configured to determine a firing order of the plurality of strings.

2. The system of claim 1, wherein the firing logic comprises rule-based logic operative to generate a non-spatially-sequential firing order.

3. The system of claim 2, wherein the rule-based logic comprises a rule that a second string fired after a first string is non-adjacent the first string.

4. The system of claim 2, wherein the rule-based logic comprises a rule that a first string is fired simultaneously with a second string, wherein the first string is non-adjacent the second string.

5. The system of claim 1, wherein the lighting panel further comprises a plurality of bars that include portions of the plurality of strings, wherein the plurality of bars extend across the panel in the first direction and are positioned adjacent one another in a substantially parallel arrangement.

6. The system of claim 5, wherein the firing order is operative to cause a first firing, a second firing and a third firing, wherein the first firing occurs before the second firing and the second firing occurs before the third firing, wherein the first firing supplies current for at least one string in a first bar, the second firing supplies current for at least one string in a second bar and the third firing supplies current for at least one string in a third bar, wherein the second bar is located below the first bar and the third bar is located above the second bar.

7. The system of claim 5, further comprising:
a first portion of the plurality of strings including solid state lighting devices that emit light in a first dominant wavelength; and
a second portion of the plurality of strings including solid state lighting devices that emit light in a second dominant wavelength,
wherein each of the plurality of bars includes at least one string of the first portion of the plurality of strings and at least one string of the second portion of the plurality of strings and wherein each of the first portion of the plurality of strings is fired in the firing order and then each of the second portion of the plurality of strings is fired in the firing order.

8. The system of claim 5, further comprising:
a first portion of the plurality of strings including solid state lighting devices that emit light in a first dominant wavelength; and
a second portion of the plurality of strings including solid state lighting devices that emit light in a second dominant wavelength,
wherein at least one string of the first portion of the plurality of strings is fired simultaneously with at least one string of the second portion of the plurality of strings.

9. The system of claim 5, further comprising:
a first portion of the plurality of strings in a first bar; and
a second portion of the plurality of strings in a second bar,
wherein the first and second portions of the plurality of strings are fired sequentially in the firing order and wherein the firing order is configured to determine the location of the second bar relative to the location of the first bar.

10. The system of claim 1, further comprising:
a first portion of the plurality of strings including solid state lighting devices that emit light in a first dominant wavelength; and
a second portion of the plurality of strings including solid state lighting devices that emit light in a second dominant wavelength,
wherein each of the first portion of the plurality of strings is fired in the firing order and then each of the second portion of the plurality of strings is fired in the firing order.

11. The system of claim 1, wherein the firing logic comprises random logic operative to generate the firing order.

12. The system of claim 1, further comprising a means for generating a feedback signal configured to provide display performance information to the control system.

13. The system of claim 1,
wherein the current supply circuit comprises a plurality of phase drivers configured to supply a plurality of on-state drive currents at a plurality of times in a firing cycle,
wherein the plurality of strings of solid state lighting devices comprise a plurality of string groups, each configured to receive current from one of the plurality of phase drivers, and wherein the control system is further configured to determine the plurality of times that each of the plurality of phase drivers begin to supply current to the plurality of string groups.

14. The system of claim 13, wherein the ratio of a quantity of the plurality of phase drivers to a quantity of the plurality of strings of solid state lighting devices is one and wherein each of the plurality of string groups comprises one of the plurality of strings of solid state lighting devices.

15. The system of claim 1, wherein the control system is configured to receive a synchronizing signal from a display controller configured to control a display and wherein the firing order is synchronized with periodic operations of the display.

16. A method for controlling a solid state lighting panel including a plurality of strings of solid state lighting devices configured to extend from a first edge of the panel to a second edge of the panel in substantially adjacent positions relative to one another, the method comprising supplying a plurality of pulsed drive currents to the plurality of strings in a non-spatially-sequential firing order.

17. The method of claim 16, further comprising:
determining the firing order that supplies current to a first string of the plurality of strings and a second string of the plurality of strings; and
defining the second string of the plurality of strings, wherein the defining is based on a location of the first string.

18. The method of claim 17, wherein defining the second string comprises selecting one of the plurality of strings that is not adjacent to the first string.

19. The method of claim 17, wherein defining the second string comprises selecting one of the plurality of strings that is located a minimum quantity of strings from the first string.

20. The method of claim 17, further comprising defining a third string of the plurality of strings, wherein the third string is configured to be fired after the second string and wherein the defining is based on a location of the second string and the location of the first string.

21. The method of claim 20, wherein defining the second string comprises selecting one of a plurality of strings that is on a first side of the first string and defining the third string comprises selecting one of the plurality of strings that is on a second side of the second string.

22. The method of claim 16, further comprising grouping a plurality of portions of the plurality of strings on a plurality of bars, wherein the plurality of bars extend across the panel from the first edge to the second edge and are positioned adjacent one another in a substantially parallel arrangement.

23. The method of claim 22, further comprising simultaneously supplying current to the portion of the plurality of strings that are in the same one of the plurality of bars.

24. The method of claim 22, further comprising simultaneously supplying current to a first string located in a first bar and a second string located in a second bar.

25. The method of claim 22, further comprising:
generating a random number;
assigning a value to each of the plurality of bars; and
simultaneously supplying current to the portion of the plurality of strings on one of the plurality of bars based on the random number.

26. The method of claim 16, further comprising:
supplying current to a first portion of the plurality of strings according to the firing order, wherein the first portion of the plurality of strings includes solid state lighting devices configured to emit light in a first dominant wavelength; and
supplying current to a second portion of the plurality of strings according to the firing order after supplying current to the first portion of the plurality of strings, wherein the second portion of the plurality of strings includes solid state lighting devices configured to emit light in a second dominant wavelength.

27. The method of claim 16, wherein defining is further based on a dominant wavelength of light emitted by the solid state lighting devices in the first string.

28. The method of claim 16, further comprising simultaneously supplying current to a first string including solid state lighting devices configured to emit light in a first dominant wavelength and a second string including solid state lighting devices configured to emit light in a second dominant wavelength.

29. The method of claim 16, further comprising:
determining the firing order that supplies current to a first string of the plurality of strings and a second string of the plurality of strings; and
defining the second string based on a dominant wavelength emitted by the solid state lighting devices in the first string and a relative position of the first string.

30. The method of claim 16, comprising determining the firing order using a numerical technique.

31. The method of claim 30, further comprising:
generating a random number;
assigning a value to each of the plurality of strings; and
supplying current to one of the plurality of strings based on the random number.

32. The method of claim 30, wherein the numerical technique comprises performing a non-linear calculation.

33. The method of claim 16, wherein the firing order comprises a deterministic order based on at least one rule.

34. A system for controlling a solid state lighting panel including a plurality of strings of solid state lighting devices that are arranged to extend across the panel in a first direction and are positioned adjacent one another in a second direction and that are supplied current by a plurality of current drivers, the system comprising:
a sequence generator that generates a firing sequence for firing the plurality of strings; and
a controller that provides control signals, responsive to the sequence generator, to the plurality of current drivers.

35. The system of claim 34, wherein the sequence generator comprises a deterministic algorithm that determines a location of a subsequently fired string based on a location of at least one previously fired string.

36. The system of claim 34, wherein the sequence generator comprises an algorithm that generates a sequence to fire a first string having a plurality of solid state lighting devices that emit light in a first dominant wavelength and a second string having a plurality of solid state lighting devices that emit light in a second dominant wavelength, wherein the second string is fired after the first string.

37. The system of claim 34, wherein the sequence generator comprises an algorithm that generates a sequence to simultaneously fire a first string having a plurality of solid state lighting devices that emit light in a first dominant wavelength and a second string having a plurality of solid state lighting devices that emit light in a second dominant wavelength.

38. The system of claim 34, wherein the sequence generator generates a random sequence of firing.

39. The system of claim 34, further comprising a plurality of bars that include portions of the plurality of strings, wherein the plurality of bars extend across the panel in the first direction and are positioned adjacent one another in the second direction.

40. The system of claim 39, wherein the firing sequence is configured to simultaneously fire a first portion of the plurality of strings and then simultaneously fire a second portion of the plurality of strings and wherein the first portion is located on a first bar and the second portion is located on a second bar.

41. The system of claim 39, wherein the firing sequence is configured to simultaneously fire a first string on a first bar and a second string on a second bar.

42. The system of claim 41, wherein the first string includes solid state lighting devices that emit light in a first dominant wavelength and the second string includes solid state lighting devices that emit light in a second dominant wavelength.

43. The system of claim 34, further comprising:
a first portion of the plurality of strings including solid state lighting devices that emit light in a first dominant wavelength; and
a second portion of the plurality of strings including solid state lighting devices that emit light in a second dominant wavelength;
wherein each of the plurality of bars includes at least one string of the first portion of the plurality of strings and at least one string of the second portion of the plurality of strings.

44. The system of claim 43, wherein the firing sequence is operative to cause the first portion of strings to fire in a first sequence and to then to cause the second portion of strings to fire in the first sequence.

45. The system of claim 34, wherein the plurality of drivers comprise a polyphase power supply configured to a supply a plurality of temporally shifted drive currents to a plurality of groups of the plurality of strings.

46. A method for controlling a solid state lighting panel including a plurality of strings of solid state lighting devices configured to extend from a first edge of the panel to a second edge of the panel in substantially adjacent positions relative to one another, the method comprising supplying a plurality of pulsed drive currents to a plurality of groups of the plurality of strings.

47. The method of claim 46, wherein each group of the plurality of groups comprises one of the plurality of strings and wherein one of the plurality of pulsed drive currents is provided for each of the plurality of strings by one of a plurality of phase drivers.

48. The method of claim 47, further comprising receiving a synchronizing signal from a display controller configured to control a refresh rate of display pixels.

49. The method of claim 46, further comprising synchronizing the plurality of drive currents with a cycles of a periodic operation of a display panel.

50. The method of claim 49, wherein the periodic operation comprises refreshing pixels and wherein the display panel comprises an LCD display panel.

51. A lighting panel system, comprising:
a lighting panel including a plurality of strings of solid state lighting devices arranged across the panel in a first direction and positioned at intervals in a second direction that is substantially orthogonal to the first direction;
a current supply circuit configured to selectively supply a plurality of on-state drive currents to the plurality of strings responsive to a plurality of control signals;
a control system configured to selectively provide control signals to the current supply circuit to selectively drive the plurality of strings, the control system further including firing logic configured to determine a firing order of the plurality of strings; and
wherein the firing logic is configured to drive the plurality of strings in a spatially non-adjacent, non-sequential firing order and/or to drive the plurality of strings at different times for at least a subset of the plurality of strings.

52. The system of claim 51, wherein the firing logic is further configured to drive the plurality of strings and/or portions thereof at least partially based on the spatial relationship between the plurality of strings and or portions thereof.

53. The system of claim 51, wherein the firing logic comprises rule-based logic configured to generate a non-spatially sequential firing order.

54. The system of claim 53, wherein the rule-based logic further comprises a rule that a second string fired after a first string is non-adjacent the first string.

55. The system of claim 53, wherein the rule-based logic further comprises a rule that if first string is fired simultaneously with a second string, then the first string is non-adjacent the second string.

* * * * *